United States Patent
Islam et al.

(10) Patent No.: US 10,903,967 B2
(45) Date of Patent: *Jan. 26, 2021

(54) FLEXIBLE SLOT ARCHITECTURE FOR LOW LATENCY COMMUNICATION

(71) Applicant: Huawei Technologies Co., Ltd., Shenzhen (CN)

(72) Inventors: Toufiqul Islam, Ottawa (CA); Kelvin Kar Kin Au, Kanata (CA); Jianglei Ma, Ottawa (CA); Mohammadhadi Baligh, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/230,135

(22) Filed: Dec. 21, 2018

(65) Prior Publication Data
US 2019/0123883 A1    Apr. 25, 2019

Related U.S. Application Data

(63) Continuation of application No. 15/709,018, filed on Sep. 19, 2017, now Pat. No. 10,205,581.
(Continued)

(51) Int. Cl.
*H04L 5/00* (2006.01)
*H04L 27/26* (2006.01)
(Continued)

(52) U.S. Cl.
CPC .......... *H04L 5/0083* (2013.01); *H04L 5/0053* (2013.01); *H04L 27/2602* (2013.01);
(Continued)

(58) Field of Classification Search
CPC . H04L 27/2602; H04L 5/0053; H04L 5/0082; H04L 5/0083; H04W 72/0406; H04W 72/044; H04W 88/02; H04W 88/08
See application file for complete search history.

(56) References Cited

U.S. PATENT DOCUMENTS 9,768,931 B2    9/2017 Nagata
10,021,715 B2 *  7/2018 Papasakellariou ..........................
H04W 72/1273
(Continued)

FOREIGN PATENT DOCUMENTS

CN    104754723 A    7/2015
CN    105764147 A    7/2016
(Continued)

OTHER PUBLICATIONS

3GPP TSG RAN WG1 Meeting #86 R1-167654, "On sPDCCH Design", InterDigital Communications, Gothenburg, Sweden, Aug. 22-26, 2016, total 4 pages.
(Continued)

*Primary Examiner* — Ahmed Elallam
(74) *Attorney, Agent, or Firm* — Slater Matsil, LLP

(57) ABSTRACT

Systems and methods are disclosed in which the start time of a downlink transmission to a user equipment (UE) is more flexible. For example, instead of beginning at predetermined starting points in a frame or subframe, a downlink transmission may instead possibly begin every x OFDM symbols, where x may be as small as one OFDM symbol.

30 Claims, 15 Drawing Sheets

Related U.S. Application Data

(60) Provisional application No. 62/398,320, filed on Sep. 22, 2016.

(51) Int. Cl.
  *H04W 88/02* (2009.01)
  *H04W 88/08* (2009.01)
  *H04W 72/04* (2009.01)

(52) U.S. Cl.
  CPC ..... *H04W 72/044* (2013.01); *H04W 72/0406* (2013.01); *H04L 5/0082* (2013.01); *H04W 88/02* (2013.01); *H04W 88/08* (2013.01)

(56) References Cited

U.S. PATENT DOCUMENTS

| | | | |
|---|---|---|---|
| 10,075,314 | B2 | 9/2018 | Ma |
| 10,205,581 | B2 * | 2/2019 | Islam .................. H04L 5/0083 |
| 10,616,887 | B2 * | 4/2020 | Shao ................. H04W 72/0446 |
| 10,660,081 | B2 * | 5/2020 | You ....................... H04L 5/0082 |
| 10,742,465 | B2 * | 8/2020 | Yamada .............. H04L 27/2608 |
| 2009/0088148 | A1 | 4/2009 | Chung et al. |
| 2015/0264667 | A1 * | 9/2015 | Lee ......................... H04L 5/001 370/329 |
| 2016/0127093 | A1 | 5/2016 | Jiang et al. |
| 2016/0226637 | A1 | 8/2016 | Nory et al. |
| 2016/0234857 | A1 | 8/2016 | Chen et al. |
| 2016/0329958 | A1 | 11/2016 | Gou et al. |
| 2016/0330003 | A1 | 11/2016 | Chung et al. |
| 2016/0338023 | A1 * | 11/2016 | Nogami .............. H04L 27/2602 |
| 2017/0208575 | A1 | 7/2017 | Chen et al. |
| 2017/0332397 | A1 | 11/2017 | Li et al. |
| 2017/0338920 | A1 | 11/2017 | Kim et al. |
| 2017/0353866 | A1 * | 12/2017 | Gou ....................... H04L 5/0007 |
| 2018/0069653 | A1 * | 3/2018 | Fujishiro ............. H04W 72/042 |
| 2018/0070341 | A1 | 3/2018 | Islam et al. |
| 2018/0083758 | A1 | 3/2018 | Islam et al. |
| 2018/0091267 | A1 | 3/2018 | Kim et al. |
| 2018/0091285 | A1 | 3/2018 | Hosseini et al. |
| 2018/0324834 | A1 * | 11/2018 | Sebire .................. H04L 5/0023 |
| 2019/0182085 | A1 * | 6/2019 | Nory ................... H04L 27/2601 |
| 2019/0268924 | A1 * | 8/2019 | Kim ................. H04W 72/1268 |

FOREIGN PATENT DOCUMENTS

| | | |
|---|---|---|
| CN | 105830363 A | 8/2016 |
| JP | 2017095314 A | 6/2017 |
| JP | 2017208817 A | 11/2017 |
| WO | 2015179135 A1 | 11/2015 |
| WO | 2016039681 A1 | 3/2016 |
| WO | 2016053844 A1 | 4/2016 |

OTHER PUBLICATIONS

3GPP TSG RAN WG1 #84 R1-160971, "Using shortened DL TTI for reduced latency data transmission", Motorola Mobility, Feb. 15-19, 2016, total 3 pages.

3GPP TSG RAN WG1 #85 R1-164458, "DL channel design for shortened TTI", Qualcomm Incorporated, May 23-27, 2016, total 7 pages.

Qualcomm Incorporated, "TDD-Specific processing time reduction and related procedures", 3GPP TSG RAN WG1 #85, R1-164462, May 22-27, 2016, 5 Pages, Nanjing, China.

* cited by examiner

FLEXIBLE SLOT ARCHITECTURE FOR LOW LATENCY COMMUNICATION

RELATED APPLICATIONS

The present application is a continuation of U.S. patent application Ser. No. 15/709,018, which was filed on Sep. 19, 2017, and titled "Flexible Slot Architecture For Low Latency Communication", which claims the benefit of U.S. Provisional Patent Application Ser. No. 62/398,320, entitled "Flexible Slot Architecture for Low Latency Communication", which was filed on Sep. 22, 2016.

U.S. patent application Ser. No. 15/709,018 and U.S. Provisional Patent Application Ser. No. 62/398,320 are both incorporated herein by reference.

FIELD

The present application relates to wireless communications, and more particularly to low latency communication.

BACKGROUND

In some wireless communication systems, user equipments (UEs) wirelessly communicate with one or more base stations. The wireless communications may be performed by transmitting orthogonal frequency-division multiplexing (OFDM) symbols, which may be transmitted according to an orthogonal multiple access scheme such as orthogonal frequency-division multiple access (OFDMA), or a non-orthogonal multiple access (NoMA) scheme such as sparse code multiple access (SCMA).

A wireless communication from a UE to a base station is referred to as an uplink communication. A wireless communication from a base station to a UE is referred to as a downlink communication. Resources are required to perform uplink and downlink communications. For example, a base station may wirelessly transmit data to a UE in a downlink communication at a particular frequency for a particular duration of time. The frequency and time duration are examples of resources.

Some UEs served by a base station may need to receive data from the base station and/or transmit data to the base station with low latency, for example by keeping (uplink and/or downlink) transmissions within 0.5 ms or the overall end-to-end (or return) latency within 1 ms. For example, a base station may serve multiple UEs, including a first UE and a second UE. The first UE may be a mobile device carried by a human who is using the first UE to browse on the Internet. The second UE may be equipment on an autonomous vehicle driving on a highway. Although the base station is serving both UEs, the second UE may need to send and/or receive data with lower latency compared to the first UE. The second UE may also need to send and/or receive its data with high reliability. The second UE may be an ultra-reliable low latency communication (URLLC) UE, whereas the first UE may be an enhanced mobile broadband (eMBB) UE.

UEs that are served by a base station and that require lower latency communication will be referred to as "low latency UEs". The other UEs served by the base station will be referred to as "latency tolerant UEs". Data to be transmitted between a base station and a low latency UE will be referred to as "low latency data", and data to be transmitted between a base station and a latency tolerant UE will be referred to as "latency tolerant data". It is contemplated that a single UE might use both low latency communication and latency tolerant communication, in which case the term "low latency UE" would refer to the activities of the single UE for the purpose of low latency communication and the term "latency tolerant UE" would refer to the activities of the single UE for the purpose of latency tolerant communication.

It is desired to accommodate the presence of both low latency and latency tolerant communications in shared time-frequency resources to improve resource utilization.

SUMMARY

Low latency data may be bursty or sporadic in nature, and may be transmitted in short packets. A transmission to/from a low latency UE may take place during a time slot which may occupy a small number of OFDM symbols (e.g., 7 OFDM symbols), and a subframe for wireless communication may be subdivided into slots. If low latency data arrives for transmission in the middle of a slot, it is required to wait until the start of the next slot before transmitting the low latency data, and latency is introduced during the waiting. Systems and methods are disclosed in which the start time of a low latency transmission is more flexible.

Systems and methods are also disclosed in which the start time of a downlink transmission to a UE is more flexible. For example, instead of beginning at predetermined starting points in a frame or subframe, a downlink transmission may instead possibly begin every x OFDM symbols, where x may be as small as one OFDM symbol. A UE is therefore configured to monitor for control information on a periodic basis, where the control information indicates a downlink transmission for the UE (e.g. the control information may be a downlink grant). The UE may be configured to monitor for the control information once every x OFDM symbols.

In one embodiment, there is provided a method performed by a UE. The method includes receiving configuration signaling. The configuration signaling indicates a plurality of start locations. Each start location occurs x OFDM symbols apart from an adjacent start location. The method may further include, for each one of at least some of the plurality of start locations, the UE monitoring for control information at that start location. The control information indicates that a downlink data transmission for the UE has been scheduled during a particular time interval that begins at that start location. The method may further include, for one of the at least some of the plurality of start locations, receiving the control information and the downlink data transmission during the particular time interval.

In another embodiment, there is provided a method performed by a base station. The method includes the base station transmitting, to a UE, configuration signaling. The configuration signaling indicates a plurality of start locations, each of which the UE is to monitor for control information. Each start location occurs x OFDM symbols apart from an adjacent start location. The method may further include the base station transmitting control information at a particular start location of the plurality of start locations. The control information indicates that a downlink data transmission for the UE has been scheduled during a time interval that begins at the particular start location. The method may further include the base station transmitting the downlink data transmission during the time interval.

UEs and base stations configured to perform the methods disclosed herein are also provided.

BRIEF DESCRIPTION OF THE DRAWINGS

Embodiments will be described, by way of example only, with reference to the accompanying figures wherein.

DETAILED DESCRIPTION

For illustrative purposes, specific example embodiments will now be explained in greater detail below in conjunction with the figures.

Figure 1:
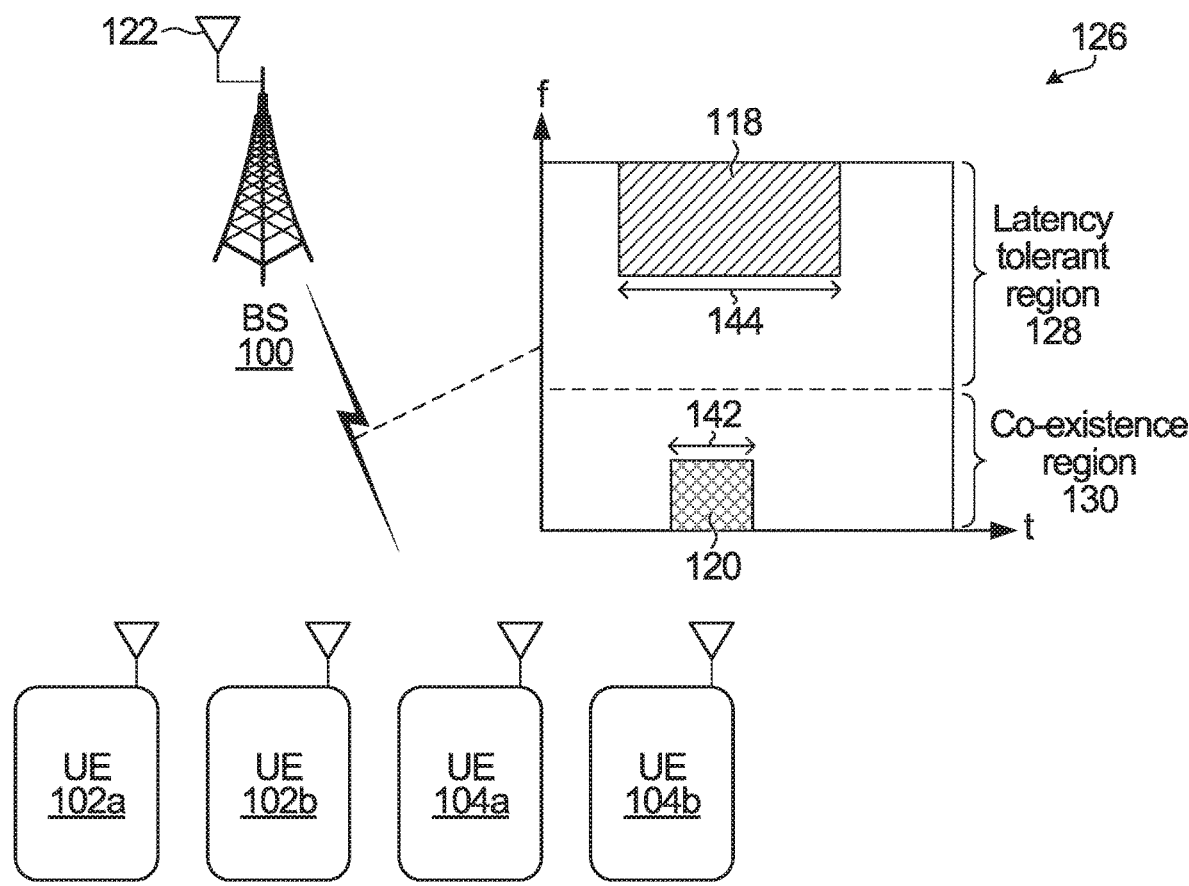
FIG. 1 is a block diagram of a base station and four UEs, according to one embodiment.

FIG. 1 is a block diagram of a base station 100, as well as four UEs 102a, 102b, 104a, and 104b served by the base station 100, according to one embodiment. UEs 102a and 102b are low latency UEs, and UEs 104a and 104b are latency tolerant UEs. That is, UEs 102a and 102b require lower latency uplink and/or downlink communication compared to UEs 104a and 104b. For example, UEs 102a and 102b may be URLLC UEs, and UEs 104a and 104b may be eMBB UEs. Although the base station 100 only serves four UEs in FIG. 1, in actual operation the base station 100 may serve many more UEs. In examples described herein, downlink transmissions to the low latency UEs are grant-based and uplink transmissions from the low latency UEs are grant-free. However, more generally uplink and/or downlink transmissions between the base station and low latency UEs may be grant-based and/or grant-free.

The base station 100 includes one or more antennas 122 to wirelessly transmit signals carrying data for UEs 102a, 102b, 104a, and 104b, and to wirelessly receive signals carrying data from UEs 102a, 102b, 104a, and 104b. Only one antenna 122 is illustrated. The base station 100 includes other circuitry and modules, but these have been omitted for the sake of clarity. For example, the base station 100 may include a processor (not shown) that executes instructions stored in a memory (not shown). When the instructions are executed, the processor causes the base station to perform the base station operations described below relating to downlink scheduling and/or allocation of resources. Alternatively, instead of a processor, the base station operations described below may be implemented using dedicated integrated circuitry, such as an application specific integrated circuit (ASIC), a graphics processing unit (GPU), or a programmed field programmable gate array (FPGA).

The word "base station" encompasses any device that wirelessly communicates with UEs using uplink and/or downlink communications. Therefore, in some implementations, the base station 100 may be called other names, such as a base transceiver station, a radio base station, a network node, an access point, a transmit node, a Node B, an evolved Node B (eNodeB), a relay station, a remote radio head, a transmit point, or a transmit and receive point. Also, in some embodiments, the components of the base station 100 are distributed. For example, some components of the base station 100 may be coupled to equipment housing the antennas 122 over a communication link (not illustrated). Therefore, in some embodiments, the term base station 100 may also refer to modules on the network side that perform operations, such as resource allocation, control information generation, and message generation, and that are not necessarily part of the equipment housing the antennas 122 of the base station 100. Although only a single base station is shown, it is contemplated that there may be more than one base station using synchronized communications to implement embodiments disclosed herein.

When a wireless transmission between the base station 100 and one or more of UEs 102a, 102b, 104a, and/or 104b occurs, the transmission uses allocated resources, for example time/frequency resources. An example of time/frequency resources is indicated at 126. Example specific resource partitions allocated to UEs are shown at 118 and 120.

A region 128 of the time/frequency resources 126 is reserved or used for the transmission of latency tolerant data, and this region 128 will be referred to as the latency tolerant region. Another region 130 of the time/frequency resources 126 is reserved or used for the transmission of both latency tolerant data and low latency data, and this region 130 will be referred to as the co-existence region. Region 128 is illustrated as a separate frequency range from region 130, although in general this need not be the case. Also, there may be another region (not shown) that is reserved just for the transmission of low latency data. Other types of regions may additionally or alternatively be present, such as other regions for coexistence of low latency and latency tolerant data. For example, the time/frequency resources could be partitioned into a low latency region and a coexistence region, or into a latency tolerant region and a coexistence region. It is also contemplated that the partitioning of the time/frequency resources could be time division multiplexing (TDM) based, frequency division multiplexing (FDM) based, or in any other suitable manner, and that the partitions may change dynamically or semi-statically over time.

The resources used for low latency communications may be partitioned into time intervals called slots. A slot used for low latency communication can be referred to as a "low latency slot" or a "mini slot". A slot may be defined as a particular number of OFDM symbols, e.g. 7 or 14 OFDM symbols in some embodiments. An example of a low latency slot duration is shown at 142. A low latency slot carries an encoded transport block to or from a low latency UE. It is contemplated that in some cases, an encoded transport block may span more than one slot. A low latency slot encompasses a particular number of OFDM symbols, e.g. 7 OFDM symbols or any other integer number of OFDM symbols. A low latency slot may be equal to, more than, or less than a subframe duration, depending upon the implementation. A low latency slot duration may be equal to one transmission time unit (TTU), or encompass multiple TTUs, depending upon the implementation. Therefore, although "low latency slot" is used herein, it may be interchangeably called a "low latency subframe" in implementations in which a low latency slot has the same duration as a subframe. Also, "low latency slot" may be interchangeably called a "low latency TTU" in implementations in which a low latency slot has the same duration as a TTU. Also, a TTU is sometimes referred to as a transmission time interval (TTI). It is contemplated that latency tolerant traffic may optionally use the same slot duration as low latency traffic.

The resources used for latency tolerant communications may be partitioned into intervals. An interval used for latency tolerant communication will be referred to as a "latency tolerant interval". An example of a latency tolerant interval is shown at 144. A latency tolerant interval is the smallest interval of time that may be scheduled or allocated for a data transmission to/from a latency tolerant UE.

As shown in FIG. 1, a low latency slot has a time duration that is shorter than a latency tolerant interval. By transmitting low latency slots of a shorter duration, the latency of the data transmissions to/from the low latency UEs may be reduced.

Each one of UEs 102*a*, 102*b*, 104*a*, and 104*b* includes one or more antennas for wirelessly transmitting data to the base station 100 and wirelessly receiving data from the base station. Only one antenna is illustrated on each UE. Each UE would also include other circuitry and modules, but these have been omitted for the sake of clarity. For example, a UE may include a processor (not shown) that executes instructions stored in a memory (not shown). When the instructions are executed, the processor causes the UE to perform the UE operations described below relating to scheduling and/or allocating of resources and/or processing control information and monitoring configuration information. Alternatively, instead of a processor, the UE operations described below may be implemented using dedicated integrated circuitry, such as an ASIC, a GPU, or an FPGA.

Figure 2:
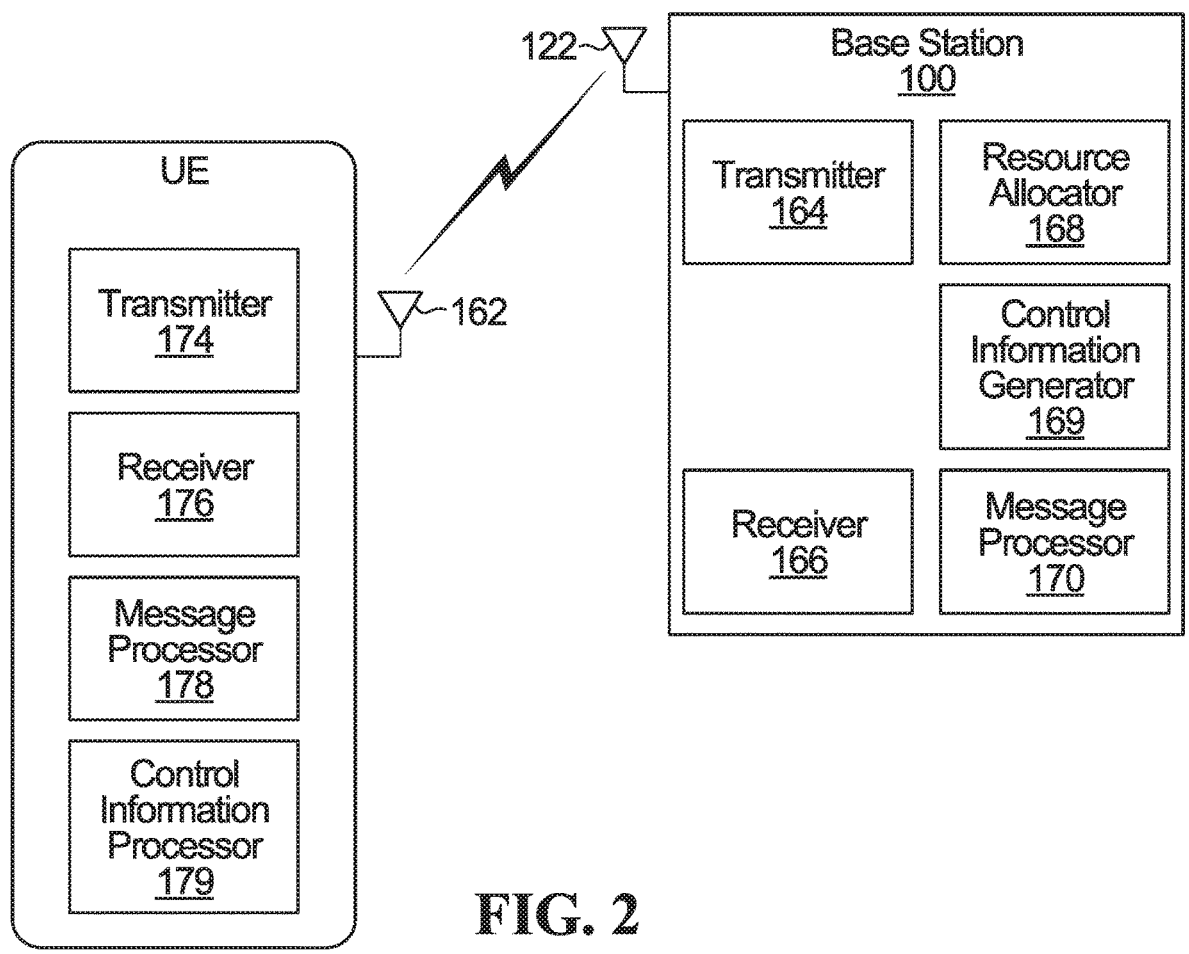
FIG. 2 is a block diagram showing an example of a base station and a UE.

FIG. 2 is a block diagram showing an example of the base station 100 and an example of a UE of FIG. 1 in more detail. The UE may be UE 102*a*, 102*b*, 104*a*, or 104*b*.

The base station 100 includes a transmitter 164 and a receiver 166 coupled to one or more antennas 122. Only one antenna 122 is illustrated. The transmitter 164 and the receiver 166 may be integrated as a transceiver. The transmitter 164 may implement some or all of the downlink physical layer operations of the base station 100, and the receiver 166 may implement some or all of the uplink physical layer operations of the base station 100. The base station 100 further includes a message processor 170 for processing uplink transmissions from the UEs. The message processor 170 may be part of the receiver 166. The message processor 170 may include a decoder (not shown) for decoding uplink transmissions from the UEs. The base station 100 further includes a resource allocator 168, which may perform operations such as: generating scheduling grants; and/or partitioning the resources into coexistence, latency tolerant only, and/or low latency only regions; and/or configuring subcarrier spacing; and/or puncturing/postponing/withholding latency tolerant data transmissions to UEs 104*a* or 104*b*; and/or allocating a flexible slot start time for low latency data in the manner discussed herein.

The base station further 100 includes a control information generator 169 that generates, among other things, the following information:

(1) The monitoring configuration information, which indicates to a UE a plurality of start locations (OFDM symbols) at which the UE is to monitor for control information. The monitoring configuration information may indicate periodic monitoring, e.g. the UE is to monitor for the control information once every x OFDM symbols.

(2) The control information for which the UE monitors. The control information indicates a downlink data transmission for the UE. If a UE supports uplink ("UL") grant-based transmission, the UE may also monitor control information in the downlink ("DL") to receive the UL grant, which assigns resources for the UL data transmission.

The monitoring configuration information and control information that are generated by the control information generator 169 are sent to the UE via the transmitter 164.

The message processor 170, the resource allocator 168, the control information generator 169, and/or any signal processing components of the transmitter 164 and receiver 166, may be implemented in the form of circuitry configured to perform the functions of the message processor 170, the resource allocator 168, the control information generator 169, and/or the transmitter 164/receiver 166. In some implementations the circuitry includes a memory and one or more processors that execute instructions stored in the memory that cause the one or more processors to perform the operations of the message processor 170, the resource allocator 168, the control information generator 169, and/or the transmitter 164/receiver 166. Alternatively, the message processor 170, the resource allocator 168, the control information generator 169, and/or any signal processing components of the transmitter 164 and receiver 166, may be implemented using dedicated circuitry, such as an ASIC, a GPU, or a programmed FPGA for performing the operations of the message processor 170, the resource allocator 168, the control information generator 169, and/or the transmitter 164/receiver 166. In yet other implementations, the functionality of the base station 100 described herein may be fully or partially implemented in software or modules stored in the memory and executed by the one or more processors.

The UE illustrated in FIG. 2 also includes a transmitter 174 and a receiver 176 coupled to one or more antennas 162. Only one antenna 162 is illustrated. The transmitter 174 and the receiver 176 may be integrated as a transceiver. The transmitter 174 may implement some or all of the uplink physical layer operations of the UE, and the receiver 176 may implement some or all of the downlink physical layer operations of the UE. The UE further includes a message processor 178 for generating messages to be transmitted in grant-based and/or grant-free uplink transmissions, and for processing received messages. Generating an uplink message may include encoding and modulating the data to be transmitted in the message. Processing a received message may include decoding and demodulating the data received in the downlink transmission message. For example, the message processor 178 may include a decoder (not shown) for decoding a downlink transmission from the base station 100. In some embodiments, the message processor 178 processes update information present in the downlink transmission (e.g. in the form of an indicator) in order to determine if there is particular data (e.g. punctured data or withheld data) in the downlink transmission message that is to be removed from decoding.

The UE further includes a control information processor 179 for processing the monitoring configuration indication received from the base station 100, and for causing the UE to monitor for the control information according to the monitoring configuration indication. The monitoring configuration indication is signaling. The control information processor 179 also processes the control information received when monitoring, e.g. to determine if there is a downlink transmission for the UE.

The message processor 178, control information processor 179, and/or any signal processing components of the transmitter 174 and receiver 176, may be implemented in the form of circuitry configured to perform the functions of the message processor 178, the control information processor 179, the transmitter 174 and/or receiver 176. In some implementations the circuitry includes a memory and one or more processors that execute instructions stored in the memory that cause the one or more processors to perform the operations of the message processor 178, the control information processor 179, and/or the transmitter 174/receiver 176. Alternatively, message processor 178, the control information processor 179, and/or any signal processing components of the transmitter 174 and receiver 176, may be implemented using dedicated circuitry, such as an ASIC, a GPU, or an FPGA for performing the operations of the message processor 178, the control information processor 179, and/or the transmitter 174/receiver 176. In yet other implementations, the functionality of the UE described herein may be fully or partially implemented in software or modules stored in the memory and executed by the one or more processors.

Low latency data may be bursty or sporadic in nature, and may be transmitted in short packets. A transmission to/from a low latency UE takes place during a slot, and traditionally one slot starts after another. If low latency data arrives for transmission in the middle of a low latency slot duration, and it is required to wait until the start of the next low latency slot before transmitting the low latency data, then latency is introduced. The latency occurs regardless of whether the transmission is grant-free or grant-based.

Figure 3:
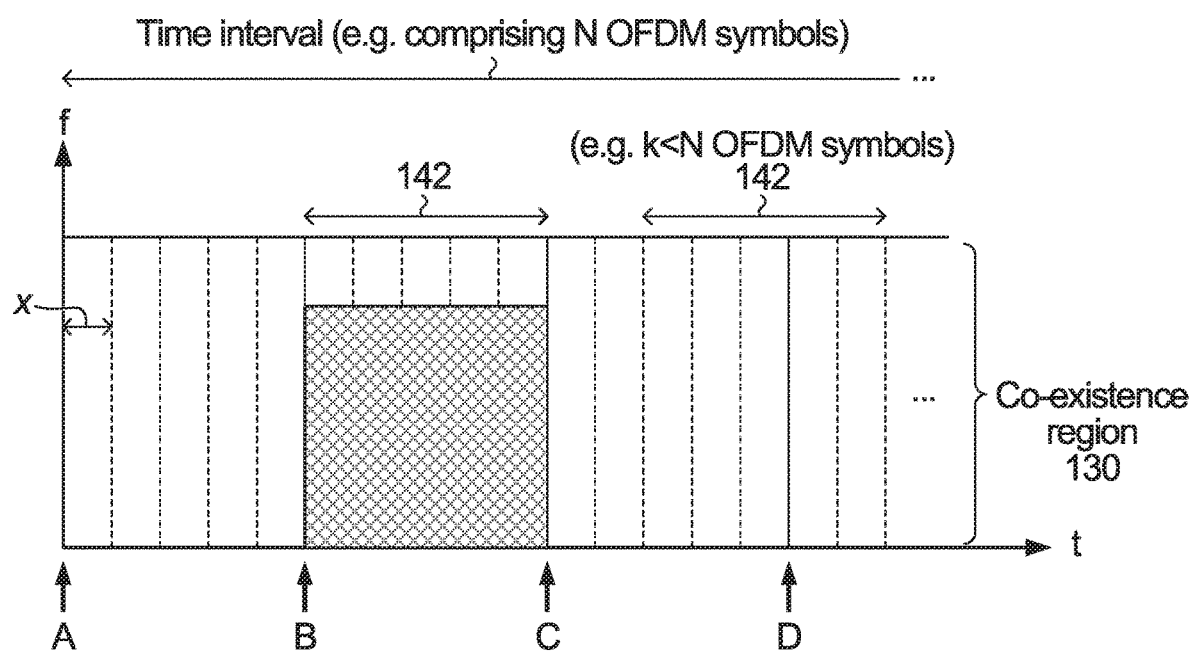
FIGS. 3 to 12 each illustrate time/frequency resources in more detail and show the coexistence of low latency and latency tolerant communications.

Systems and methods are disclosed in which the start time of a low latency slot in the co-existence region 130, or in any region containing low latency traffic, is more flexible. For example, FIG. 3 illustrates the co-existence region 130 in more detail. Instead of a low latency slot only beginning at predetermined starting point A, B, C, or D, a slot may instead begin every x OFDM symbols, that is each start location occurs x OFDM symbols apart from an adjacent start location. x can be as small as one OFDM symbol. In FIG. 3, x is the duration of one OFDM symbol, but this is only an example. In FIG. 3, subsequent pre-determined starting positions have an interval of 5x OFDM symbols. In some embodiments, x may instead be measured in time, e.g. x milliseconds, corresponding to an integer number of OFDM symbols in a predetermined numerology. This implies that transmission of a UE can be configured to start every x ms regardless of numerology, and x ms may comprise a different number of symbols in different numerologies. For example, if x is 0.5 ms, then it corresponds to 7 symbols based on 15 kHz subcarrier spacing, 14 symbols based on 30 kHz subcarrier spacing, and 28 symbols based on 60 kHz subcarrier spacing for normal CP overhead. Hence, in number of symbols, the periodicity of potential starting positions can be scalable.

In FIG. 3, the low latency slot durations are still fixed, but the slot start time is configurable and therefore more flexible. In some embodiments, low latency slots allocated to different UEs may co-exist and possibly use overlapping resources. Different UEs may have different low latency slot durations. Also, even though embodiments are presented with respect to a time-frequency region where both low latency and latency tolerant transmissions may coexist, the principles discussed herein regarding flexible starting position can be applicable to any time-frequency region where there is benefit to have this flexibility. Moreover, the principle of flexible starting position can be applicable to both TDD and FDD systems, as shown in examples and embodiments below.

More generally, and still with reference to FIG. 3, a particular time interval may have N OFDM symbols, and a low latency transmission may have a duration of k<N OFDM symbols. The low latency transmission may advantageously begin at any one of m>N/k possible OFDM symbol locations within the time interval. Note that this is only an example. As discussed above, the low latency transmission may be configured to begin every x OFDM symbols within a time interval for a given numerology.

Some more specific example embodiments will now be described. The time/frequency resources described below may be part of the time/frequency resources 126.

Figure 4:
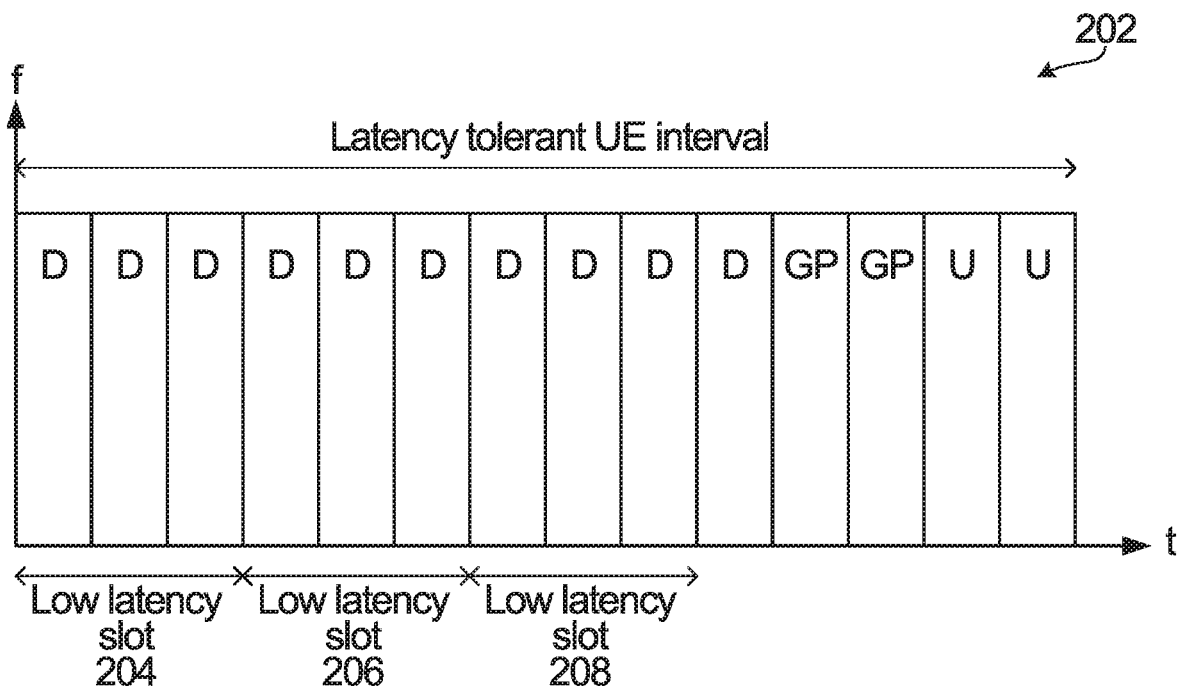

FIG. 4 illustrates a portion of time/frequency resources 202, according to one embodiment. The blocks labelled "D" are downlink OFDM symbols, the blocks labelled "U" are uplink OFDM symbols, and the blocks labelled "GP" are OFDM symbol durations used as a guard period during which there is no data transmission. The notation "D", "U", and "GP" will also be used in other figures. However, in all embodiments described with reference to uplink and downlink symbols in the same time interval separated by a guard period, it should be understood that the embodiment can apply equally to time intervals that are uplink only, or downlink only, as applicable. In these examples, a slot may include multiple symbols irrespective of whether they occur within a common latency tolerant interval, or whether they coexist with latency tolerant traffic. Note also that a latency tolerant interval may be any interval that is longer than the duration of a low latency transmission.

A duration in time equal to one latency tolerant interval is illustrated in FIG. 4. The illustrated time interval is "downlink dominated" because it includes more downlink OFDM symbols than uplink OFDM symbols. Also, the time interval may be referred to as a "self-contained time division duplex (TDD) time interval" because there are both downlink and uplink OFDM symbols. The portion of time/frequency resources 202 illustrated may be referred to as having a self-contained TDD time interval equal to the latency tolerant interval. More generally, the interval consists of at least one DL to UL switching point.

In FIG. 4, there are three downlink low latency slots 204, 206, and 208, for transmitting low latency data. As an example, if the base station 100 has low latency data to send to low latency UE 102a, then the base station 100 may schedule the low latency data in downlink low latency slot 204. However, if during low latency slot 204, low latency data for low latency UE 102b arrives at the base station 100, then the base station 100 needs to wait until the start of the second low latency slot 206 to transmit the data to low latency UE 102b. Waiting until the start of the second low latency slot 206 may introduce an unacceptable amount of latency. In this example, the DL transmission can only begin at some pre-fixed locations within the interval comprising DL symbols. Other slot configurations are possible. A slot may contain symbols that are not contiguous in time, for example a slot may include one or more final downlink symbols in one latency tolerant interval and one or more initial downlink symbols in the following latency tolerant interval. This implies that a low latency transmission may comprise OFDM symbols that are not contiguous in time. This is due to the fact that some OFDM symbols may be unknown or reserved from a UE perspective, which may not be used for transmission and/or reception of control and/or data. A low latency transmission can be made avoiding such symbols.

Figure 5:
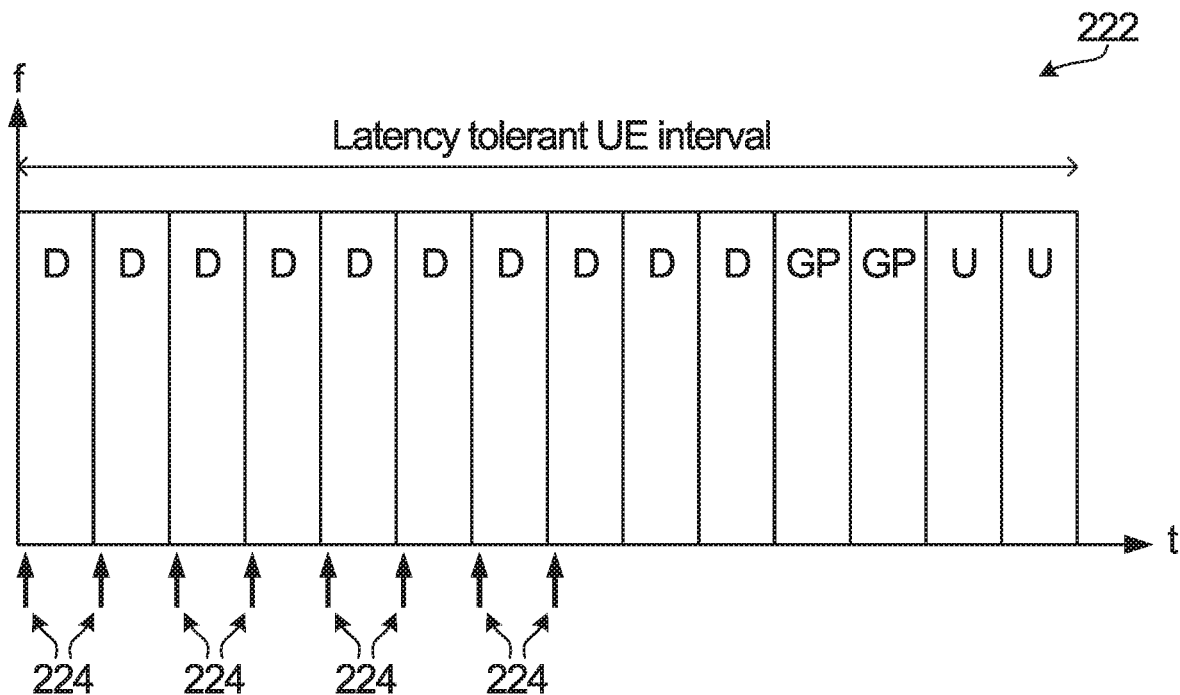

FIG. 5 illustrates a portion of time/frequency resources 222, according to another embodiment in which there is flexibility in where low latency slots may begin. In FIG. 5, a low latency downlink slot may begin at any one of the first eight downlink OFDM symbols, as shown at 224. The start location of a low latency slot can be flexible to try to reduce or minimize access delay. In this example, x is 1 OFDM symbol. In the embodiment of FIG. 5, the duration of a low latency slot is three OFDM symbols, which is why a low latency slot cannot start at the beginning of the last two downlink OFDM symbols. Alternatively, some UEs may receive transmission in the last few DL symbols if they support non-contiguous transmission, as mentioned above. However, if the latency tolerant interval contains only downlink symbols, it is contemplated that a low latency slot may start at the beginning of any symbol. Using the "N" and "k" notation of FIG. 2, in the example in FIG. 5: N=10, k=3, and the start of the low latency slot may begin at any one of the first m=N−k+1=8 downlink OFDM symbols.

A low latency slot duration of three OFDM symbols is only an example. The number of OFDM symbols in a low latency slot may be more or less. Similarly, the number of OFDM symbols in a latency tolerant interval, including the number of downlink OFDM symbols, the number of uplink OFDM symbols, and/or the duration of the guard period, may be different from the illustrated embodiments. Also, the format and location of the control information for the low latency UEs is implementation specific. In one embodiment, at the start of each of the first eight downlink OFDM symbols, each low latency UE that is not in the process of receiving a downlink low latency data transmission monitors control information to determine whether a downlink low latency data transmission to the low latency UE will begin at that OFDM symbol. This example implies that some UEs can be configured to monitor control information every symbol (i.e., x=1 OFDM symbol) and in some cases, UEs may be configured to skip some monitoring occasions if they are receiving data.

Figure 6:
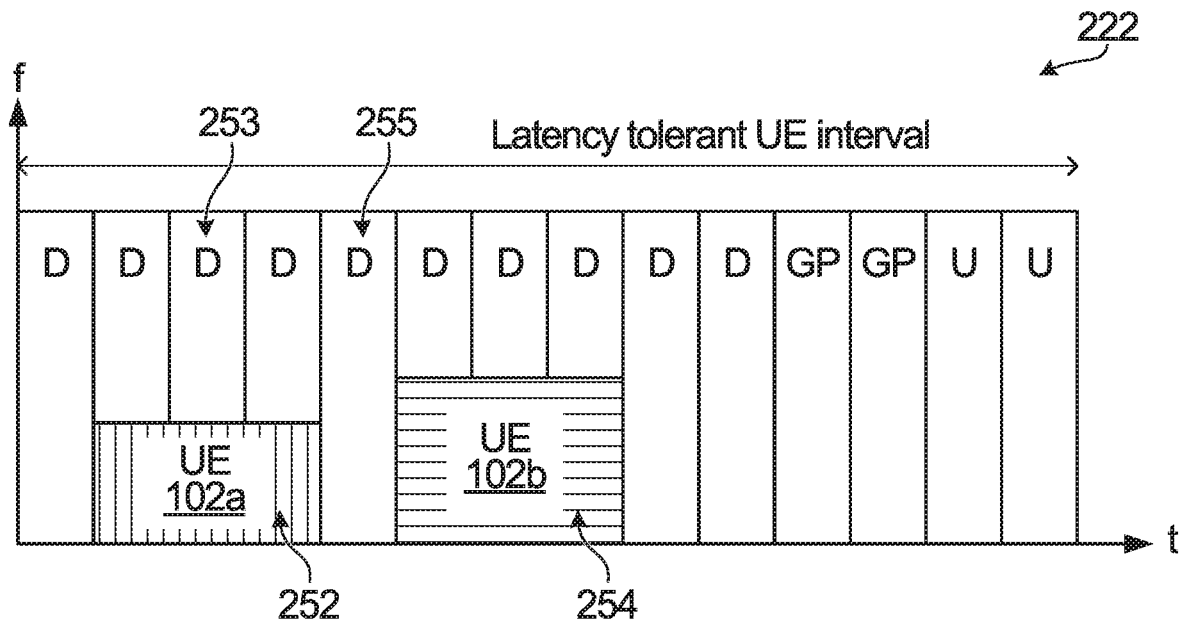

FIG. 6 is the embodiment of FIG. 5 showing an example in which a low latency slot for low latency UE 102a is scheduled on resources 252, and a low latency slot for low latency UE 102b is scheduled on resources 254. Note that duration of three OFDM symbols is only an example and in practice, durations of 252 and 254 can be different and any number of symbols. In this example, there is more low latency data to send to UE 102b compared to UE 102a, which is why the amount of frequency resources allocated to UE 102b is greater than the amount of frequency resources allocated to UE 102a. In FIG. 6, low latency slots cannot overlap. If the low latency data for UE 102b had arrived earlier, e.g. at the third downlink OFDM symbol 253, the low latency data for UE 102b could not have begun being transmitted until at least the fifth downlink OFDM symbol 255.

Figure 7:
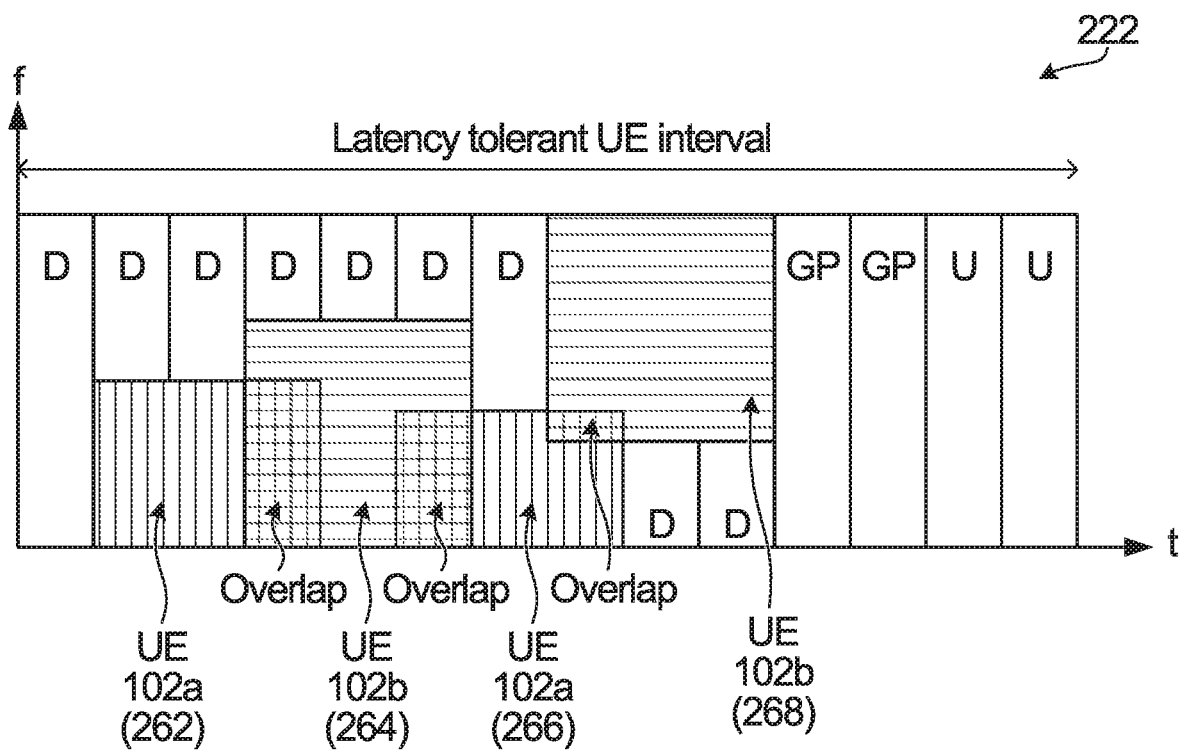

FIG. 7 is the embodiment of FIG. 5 showing an example in which a first low latency slot for low latency UE 102a is scheduled on resources 262, a first low latency slot for low latency UE 102b is scheduled on resources 264, a second low latency slot for low latency UE 102a is scheduled on resources 266, and a second low latency slot for low latency UE 102b is scheduled on resources 268. Note that duration of three OFDM symbols is only an example and in practice, durations of 262, 264, 266, and 268 can be different and any number of symbols. This does not change the principle of flexibility of starting position. Alternatively, the low latency slots may be for four different low latency UEs. As shown in FIG. 7, low latency slots for different low latency UEs overlap in time, but may be mapped to orthogonal or non-orthogonal resources, for example in the frequency domain.

As is clear from FIGS. 6 and 7, multiple low latency slots can coexist in one latency tolerant interval, and the start location of each low latency slot can be configurable and therefore flexible to try to reduce or minimize access delay. Low latency slots for the low latency communications are assigned as low latency data arrives at the base station. A possible benefit of FIG. 6 compared to FIG. 7 is that by not overlapping low latency slots, there may potentially be less interference. Also, a low latency UE in the FIG. 6 embodiment would only need to monitor control information to determine whether there is a low latency data transmission during OFDM symbols when a low latency data transmission is permitted to begin. This implies UE monitors control information at configured locations and the control information, if received and detected by the UE, notifies the UE about an imminent DL data transmission in a time interval during which a downlink transmission can start. A low latency UE in the FIG. 7 embodiment, that is not receiving a low latency data transmission, would need to monitor control information in every one of the first eight downlink OFDM symbols to determine whether there is a low latency data transmission scheduled for it.

Note that transmission to different UEs may coexist in an overlapping manner, in time and/or frequency, and part of the transmission of one UE may overlap with the control region of another UE's transmission. For example, transmission of UE 102a may potentially overlap with the control region of UE 102b. The network may configure some control regions by RRC signaling in one or more symbols (the configured control regions may or may not have any associated periodicity) and provide the information to one or more UEs. When the UEs receive a transmission overlapping the control region and if they are aware of the configured region, the UEs may not receive data in the overlapping region even though the transmission overlaps the region in time (e.g., transmission of the UE is rate-matched around the critical region, if the region is known to UE). Alternatively, the UE may receive data in the overlapping region, and if another later transmission to a different UE is received in the overlapping region, transmission of the former UE can be pre-empted by the later transmission in the overlapping region. As discussed below, some control signaling with update of resource assignment may be signalled to the first UE.

In the embodiments illustrated in FIGS. 6 and 7, any downlink transmissions to a low latency UE use resources that are also used to send downlink transmissions to latency tolerant UEs. Therefore, a joint transmission scheme may be used to try to overcome interference, e.g. using different code resources to transmit the latency tolerant data and the low latency data. Alternatively, whenever a low latency data transmission is scheduled during the latency tolerant interval, the latency tolerant data to be transmitted on the low latency resources may be punctured or withheld for later downlink transmission. A control signal may notify the affected latency tolerant UEs that the latency tolerant data transmission has been punctured or withheld. The control signal may be multiplexed in one or more locations during the transmission of low latency or latency tolerant traffic. The latency tolerant UE may monitor for control signals containing puncturing information in one or more locations (configured in time and/or frequency) after a latency tolerant transmission has been scheduled. The number of monitoring locations may depend on duration of the low latency transmission, as the latency tolerant transmission duration may span multiple configured locations for the presence of control signals.

Figure 8:
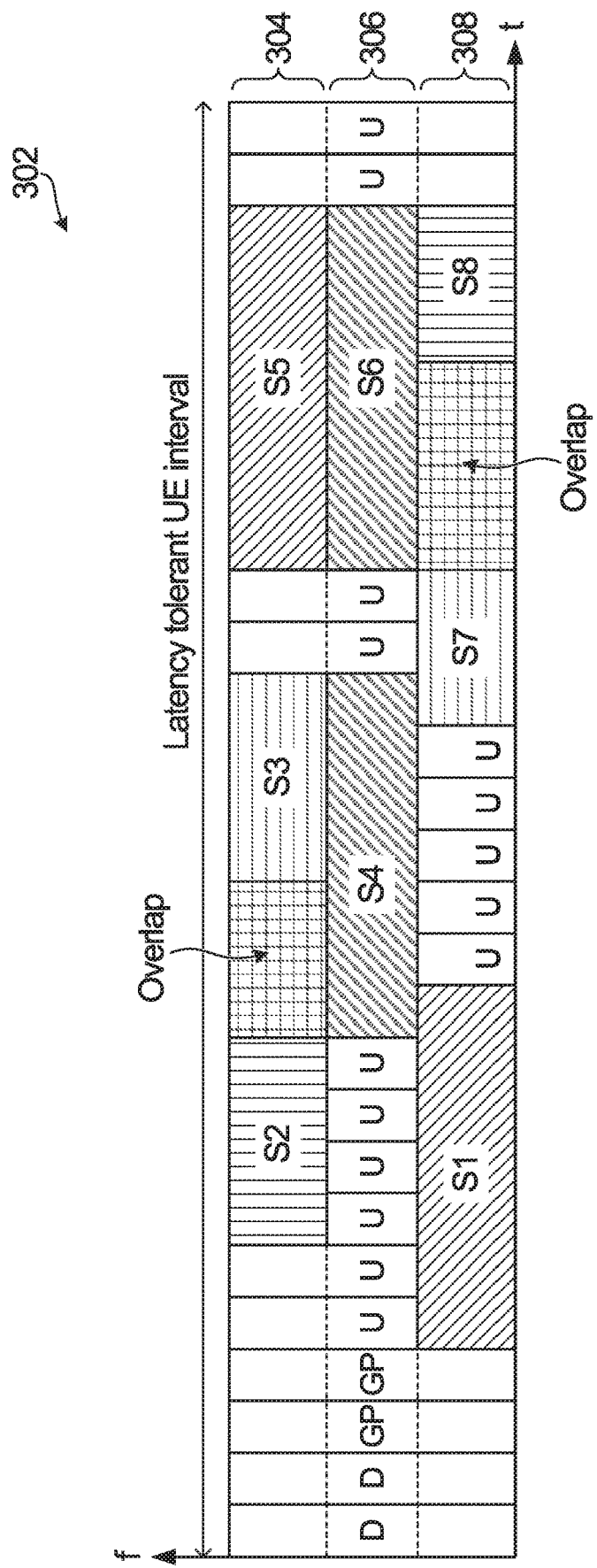

FIG. 8 illustrates a portion of time/frequency resources 302, according to another embodiment. A duration in time equal to one latency tolerant interval is illustrated. The illustrated time interval is "uplink dominated" because it includes more uplink OFDM symbols than downlink OFDM symbols. Also, the illustrated time interval is a self-contained TDD time interval equal to the latency tolerant interval. Even though FIG. 8 shows overlap of different low latency slots in an interval where there is DL to UL switching, the principle of overlapping transmission and slot architecture can be applicable to any UL resources, in TDD and FDD systems.

Multiple low latency uplink slots coexist and are labelled in FIG. 8 as "S1" to "S8". The different low latency slots may be used by different low latency UEs, and the start time of each low latency slot can occur at the start of any symbol. For the uplink, the network can configure UL resources to different UEs in an overlapping manner and starting positions for different transmissions from different UEs can be configured with different intervals, i.e., value of x can be different for different UEs. Each low latency slot is 7 OFDM symbols in duration, but this is only an example. In general, some low latency slots may overlap in time and frequency, e.g. S2 and S3. Also, some low latency slots may overlap in time, but are mapped to other orthogonal or non-orthogonal resources. For example, a low latency UE sending a grant free uplink transmission during slot S5 overlaps in time with another low latency UE sending a grant free uplink transmission during slot S6, but the two grant free uplink transmissions are mapped to orthogonal frequency resources. Alternatively, some or more UL transmissions can be grant-based. A UE supporting grant-based transmissions can be configured to monitor control signaling every x symbols in DL resources. If control signaling indicating a grant is received (e.g., in the DL symbols at the beginning of the interval), the UE can start its UL transmission potentially at any symbol within the UL symbols of the interval in FIG. 8. Similar to DL transmission, the start position of the UL transmission can be flexible for both grant-based and grant-free transmissions. Similarly to the DL, a UE can be configured to start its transmission in UL resources every x symbols. In some cases, a UE may not be able to start its UL transmission in one or more of every x symbols, if the symbols are no longer available for UL transmissions, e.g., if the slot format changes.

In the embodiment of FIG. 8, the uplink resources are partitioned into three frequency regions 304, 306, and 308. A mapping known to the low latency UEs and the base station may provide information indicating the region 304 or 306 or 308 in which the low latency UE is to transmit. This implies semi-statically some resource partitions are indicated to the UEs. The region 304 or 306 or 308 in which a low latency UE is to transmit may be based on the uplink OFDM symbol at which the low latency UE begins its uplink data transmission. Also, the embodiment of FIG. 8 could be used for acknowledgement/negative acknowledgement ("A/N")-less uplink low latency data transmission, in which case all of the symbols could be uplink symbols. If the uplink low latency data transmission is instead A/N-based, then the number of uplink OFDM symbols interposed between downlink OFDM symbols may be reduced in order to provide more frequent opportunities for A/N on the downlink.

Figure 9:
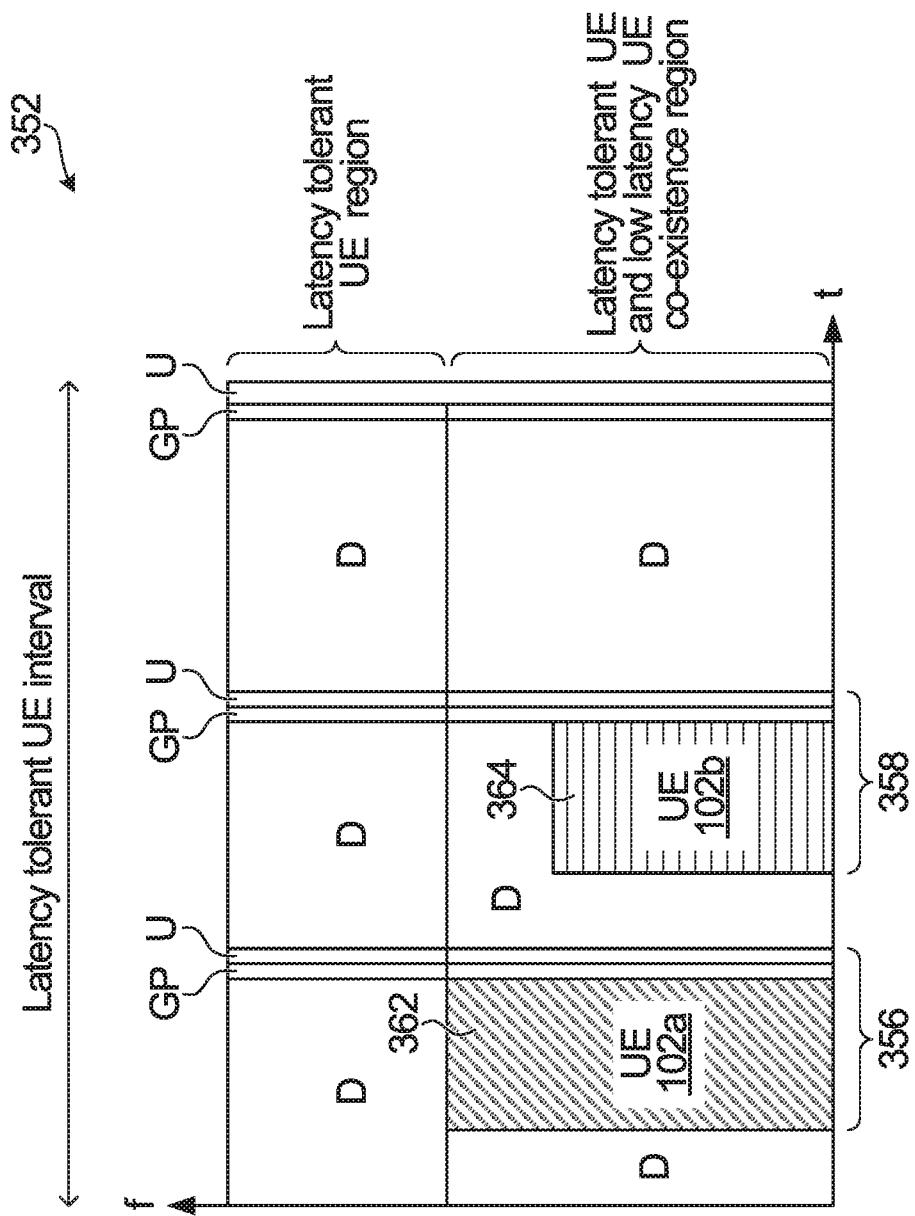

FIG. 9 illustrates a portion of time/frequency resources 352, according to another embodiment. A duration in time equal to one latency tolerant interval is illustrated. The illustrated time interval is downlink dominated. Individual OFDM symbols are not illustrated.

Low latency UEs 102a and 102b are opportunistically scheduled in the coexistence region. The slot start time of the low latency data transmissions may be flexible, e.g. as described above. However, in FIG. 9 downlink dominated low latency self-contained intervals are scheduled within the DL portion of a latency tolerant interval in the coexistence region, as shown at 356 and 358. Therefore, a latency tolerant interval must be greater than or equal to a low latency interval in this embodiment. It is contemplated that the latency tolerant region and the coexistence region may use different numerologies.

The latency tolerant data to be transmitted on the scheduled downlink low latency resources 362 and 364 may be jointly transmitted, or punctured, or withheld for later downlink transmission. A control signal may notify affected latency tolerant UEs that the latency tolerant data transmission has been punctured or withheld. During the guard period and uplink portions of the low latency self-contained intervals 356 and 358, there is no downlink transmission, not even in the latency tolerant UE region, in order to mitigate interference.

The frequency of a control indicator notifying the latency tolerant UEs of the presence of a self-contained low latency interval may be configurable. The location of the control indicator may be pre-configured. The interval between pre-configured locations of the indicator may be equal or shorter than a low latency slot duration, so that low latency transmissions can be initiated more frequently than once per slot duration. For example, if the slot duration is three symbols and a low latency transmission may be initiated at any symbol, then the frequency of the control indicator is every symbol. This implies a scenario where duration of DL symbols within the latency tolerant interval can be long and ACK/NACK ("A/N") feedback of any scheduled low latency transmission would have to wait at least until the UL symbols at the end of the latency tolerant interval. To provide opportunities for faster A/N feedback, one or more low latency transmissions can be scheduled with an associated UL resource that is assigned before the UL symbols in the latency tolerant interval, potentially in the symbols that were previously configured as DL symbols. A DL control signaling, either UE specific or group-common, notifies the UEs of switching some of the DL symbols to UL symbols, e.g., notifies the latency tolerant UEs of the presence of low latency transmission and that low latency DL transmission is accompanied by one or more UL symbols. Latency tolerant UEs do not receive any transmission during the guard period and UL symbols. The DL control signaling notifying the change (i.e., some DL symbols of latency tolerant interval converted to GP/Unknown and UL symbols) may be received in the same symbol where control signaling scheduling the low latency transmission is received, or at different symbols, either before or after the low latency transmission begins. In one example, the control signaling (for this potential switch of DL→UL or GP/Unknown) may be monitored with a configured periodicity within the DL symbols of a TDD system. For example, if the configured duration (e.g., a slot) originally contains N DL symbols, then the UE can monitor for the dynamic signaling every K symbols where 1<=K<N, which may indicate over-riding of some DL symbols to GP/Unknown and/or UL symbols. In one example, the DL control signaling indicating the switch, may provide location of the GP/Unknown and/or UL symbols to both latency tolerant and low latency UEs. In one example, the DL signaling only indicates Unknown symbols to represent the newly converted DL symbols. Latency tolerant UEs will neither receive nor transmit in the symbols indicated as Unknown. Low latency UEs may receive an indication of A/N resources in the DL scheduling grant in one or more of the Unknown symbols, i.e., UE specific DCI of low latency UEs over-rides one or more Unknown symbols to UL symbols. This procedure provides DL low latency transmission to have faster A/N opportunity within a TDD frame structure where originally configured DL durations may be long and instead of always providing frequent UL transmission opportunity, UL resources are configured on-demand basis, especially when there is a low latency DL transmission scheduled requiring faster A/N feedback. DL control signaling indicating the switch is only transmitted when there is a need to switch. However, the UEs may still need to monitor at the configured locations. The DL control signaling may indicate a set of contiguous symbols within a reference interval (such as within a group of OFDM symbols within the DL symbols of the latency tolerant interval) as Unknown and/or UL. For example, with respect to a reference position such as start of DL symbols or any other location, the signaling may indicate one or both of a starting position and duration, or one or both of a starting and ending position. If duration/length of contiguous symbols is pre-configured, indicating a starting position may be enough. Then, unless overridden by a DCI or PDCCH, UEs assume no action on the symbols indicated as Unknown. The indicated UL symbols, if any, can be used by either or both of low latency and latency tolerant UEs. Newly converted UL symbols can be used for Scheduling Request (SR), or Sounding Reference Signal (SRS) transmissions as well as, A/N feedback. In one example, latency tolerant UEs may be configured to use the UL symbols to transmit early A/N feedback. In another example, either or both low latency and latency tolerant UEs can be configured to transmit A/N feedback in the indicated UL symbols.

In some embodiments, the low latency data transmission in low latency self-contained intervals 356 and 358 may have a different numerology compared to the latency tolerant data transmissions. For example, the latency tolerant data transmissions may use a 30 kHz subcarrier spacing, and the low latency data transmissions may use a 60 kHz subcarrier spacing. By using a 60 kHz subcarrier spacing instead of a 30 kHz subcarrier spacing, the OFDM symbols of the low latency transmissions would be shorter than the OFDM symbols of the latency tolerant transmissions. This can be achieved by using two different numerologies with symbol alignment, such that the start and end times of at least some of the symbols of one numerology align with start and end times of symbols of the other numerology. In this embodiment, a filter or other suitable means may be used to reduce the interference between the latency tolerant transmissions and the low latency transmissions of different numerologies.

Figure 10:
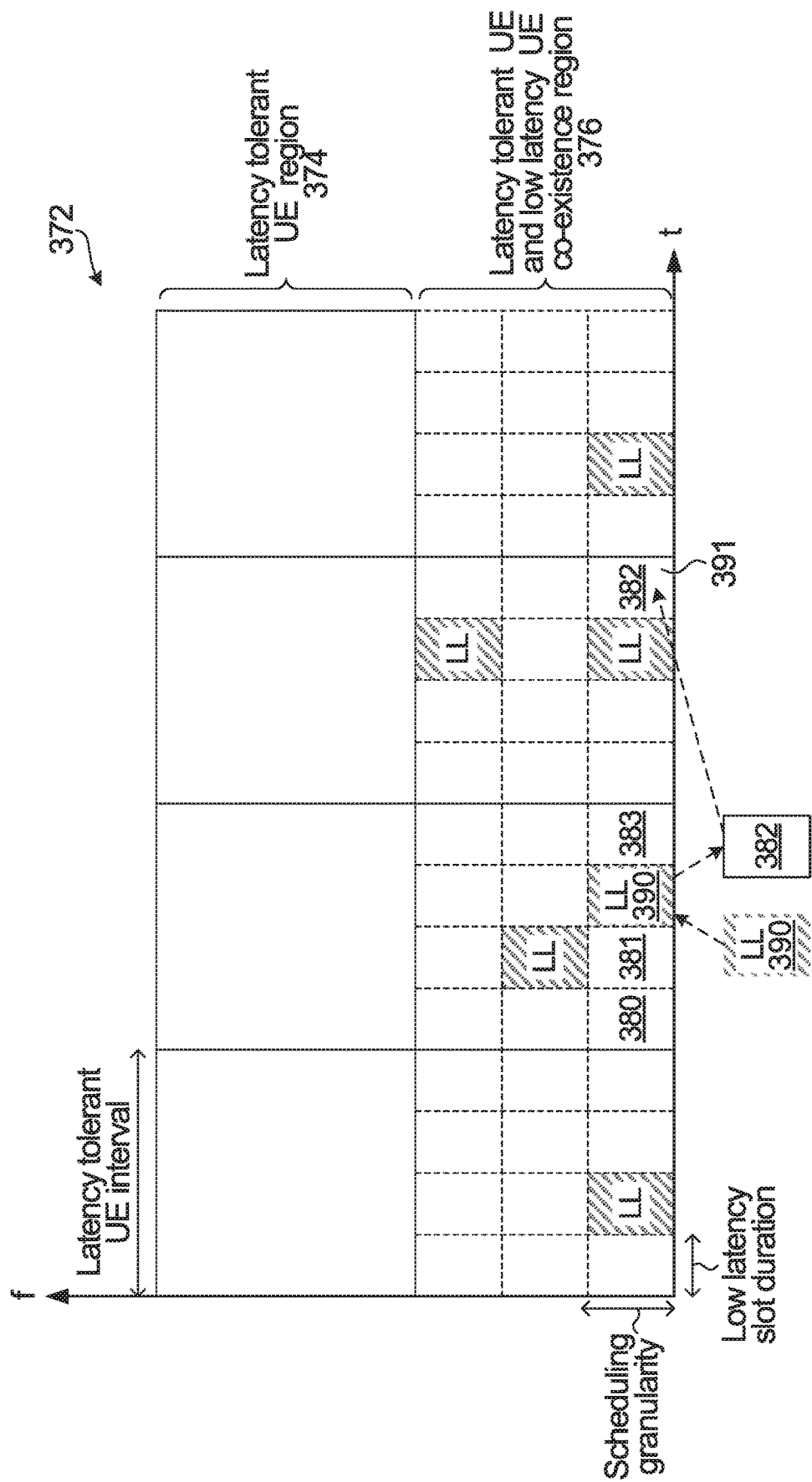

FIG. 10 illustrates a portion of downlink time/frequency resources 372, according to another embodiment. Because all of the illustrated resources are downlink resources, the notation "D" has not been added. Also, individual OFDM symbols are not illustrated in FIG. 10.

The resources 372 are partitioned into a latency tolerant UE region 374 and a coexistence region 376, which may or may not have the same numerology. There is dynamic resource sharing between the latency tolerant communications and the low latency communications in the coexistence region 376. It is contemplated that the latency tolerant region and the coexistence region may use different numerologies.

Larger latency tolerant data packets are scheduled in the latency tolerant UE region 374, e.g. packets that, when encoded, are the duration of a latency tolerant interval. The scheduling granularity of the coexistence region 376 is smaller than the scheduling granularity of the latency tolerant region 374. For example, in FIG. 10 there are four scheduling intervals in the coexistence region 376 for every one latency tolerant interval. Each scheduling interval in the coexistence region 376 is equal to a low latency slot duration. Smaller latency tolerant data packets are scheduled in the coexistence region 376, in particular packets that, when encoded, correspond to the scheduling interval in the coexistence region. It is contemplated that low latency traffic in the coexistence region 376 may have a different scheduling granularity than latency tolerant traffic in the coexistence region 376. For example, the scheduling interval of the latency tolerant traffic in the coexistence region 376 may be an integer multiple of the scheduling interval of the low latency traffic in the coexistence region 376.

Latency tolerant data packets may be scheduled in the coexistence region at every latency tolerant interval, or at shorter intervals. The scheduling of latency tolerant data packets in each latency tolerant interval in the coexistence region is performed by bundling the four low latency slot durations. For example, latency tolerant data packets 380, 381, 382, and 383 are scheduled at the start of the second illustrated latency tolerant interval. It is contemplated that more or fewer than four low latency slots may be bundled. Each of the latency tolerant data packets 380, 381, 382, 383 is separately encoded to correspond to the duration of the low latency slot. However, low latency data 390 arrives to be transmitted during the second low latency slot of the second latency tolerant interval in the coexistence region. Scheduled latency tolerant packet 382 is therefore withheld from transmission. Note that in this embodiment, scheduled latency tolerant packet 382 is not punctured or jointly transmitted, but is instead held back and transmitted at a later time, e.g. as illustrated at 391. In this embodiment, the receiver of the data packets 380, 381, 383 is able to decode each of these packets without receiving the data packet 382, because all four data packets 380, 381, 382, 383 are separately encoded. As a result, the transmission of low latency data 390 does not interfere with the reception of the data packets 380, 381, 383, and does not necessitate retransmission of the data packets 380, 381, 383.

FDM provides the flexibility to schedule eMBB (more generally latency tolerant UEs) and URLLC (more generally low latency UEs) together in shared resources. In FIG. 10, an example is shown where two regions are identified: eMBB only region and coexistence region. Large packets of eMBB data can be scheduled in the eMBB only region, whereas some small eMBB packets may coexist with URLLC traffic in the coexistence region. To lower overhead, eMBB can be scheduled by bundling multiple URLLC slots in the coexistence region. If URLLC packets arrive after eMBB is scheduled, the system postpones transmission of one or more packets of eMBB and assigns the resources to URLLC traffic. eMBB UEs can be notified of this during the transmission. This does not require puncturing, which is otherwise needed for TDM based coexistence when eMBB has longer interval than URLLC slot.

Low latency packets scheduled in the coexistence region 376 are labelled "LL" in FIG. 10. Although not illustrated, a low latency packet may be scheduled in the first scheduling interval of a latency tolerant interval. In any case, suitable control information is needed to inform the affected latency tolerant UEs that transmission of a latency tolerant packet in the coexistence region 376 has been postponed. In some embodiments, the control information notifying a latency tolerant UE that a latency tolerant packet transmission has been postponed may be multiplexed with the low latency control information at the start of the low latency slot. The low latency control information would indicate to the low latency UE that a low latency data transmission has been scheduled in the slot.

During operation, larger latency tolerant packets are scheduled in the latency tolerant region 374. The latency tolerant UEs receiving data in region 374 do not need to monitor control information to see if the transmission has been interrupted by a low latency transmission because region 374 is dedicated to the transmission of latency tolerant data. Smaller latency tolerant packets are scheduled in the coexistence region 376, and the latency tolerant UEs receiving data in coexistence region 376 monitor control information to see if the transmission of any of their scheduled packets has been interrupted and postponed by a low latency transmission. This implies that if the data of latency tolerant UEs overlaps with the configured time-frequency resources 376 where both traffic can be scheduled (i.e., region 130 in FIG. 1), then the latency tolerant UEs will have to monitor for an indication that provides an update of scheduling assignment or puncturing information. A configuration indication can be provided to the UEs to turn on monitoring the puncturing indication, which the UE does after its data is scheduled overlapping the configured coexistence region. The puncturing indication payload that provides pre-emption or puncturing information to one or more UEs can include or be appended with a Cyclic Redundancy Check (CRC) to facilitate error correction or detection. The CRC can be masked or scrambled with an identifier specific to the intended receiver or group of receivers (e.g. a Radio Network Temporary Identifier (RNTI) as used in a conventional PDCCH structure to facilitate blind detection. The indication payload can be encoded with different channel coding techniques such as Polar coding, Low-Density Parity-Check (LDPC) coding, and Turbo coding. and modulated with different modulation schemes such asBinary Phase-Shift Keying (BPSK), Quadrature Phase Shift Keying (QPSK), M-ary Quadrature Amplitude Modulation (M-QAM), where M can be any integer multiple of 2 or can be $2^N$, where N is a positive integer. For example, N can be one of {1, 2, 3, 4, 5, 6, 7, 8}. A Demodulation Reference Signal (DMRS) density can be J/K<1, where J and K are positive integers. For example, J can be 1 and K can be one of {2, 3, 4, 5, 6, 7, 8}. In another example, J can be 2 and K can be one of {3, 5, 7}. A set of DMRS densities may be configured at the UE and one can be used (by the UE) for a given numerology. Interleaving amongst Resource Element Groups (REGs) or bundles of REGs (bundle size can be of size 2, 3, 4, 5 or 6) can also be used to increase robustness. For each carrier, a puncturing indication (PI) can be configured, i.e., if a UE receives a transmission over multiple carriers, it may need to monitor for a PI in each carrier. Alternatively, a PI can be configured addressing pre-emption over multiple carriers and the UE monitors for a PI in only one of the aggregated carrier where a PI is configured.

In an example, latency tolerant UEs receive control information at the beginning of the latency tolerant interval, regardless of whether a low latency packet is scheduled in the first slot or later. If low latency traffic comes in the first slot, the control signals for the latency tolerant and low latency traffic are multiplexed in the first few symbols of the first slot. The control information may notify the latency tolerant UE that the first slot is no longer assigned to the latency tolerant communication, but the remaining slots or parts of the remaining slots are assigned to the latency tolerant communication. In addition, if transmission of one or more bundled eMBB (latency tolerant) slots is postponed, a low overhead indicator can notify the eMBB (latency tolerant) UE of the updated scheduling. The postponed or punctured transmission can be further scheduled by the base station at a later time.

In an alternative example, the latency tolerant UE has the option to receive regular control information in any of the slots. For example, if the first slot is used for URLLC (a low latency UE), then if the latency tolerant UE did not detect a control signal in the first slot, the latency tolerant UE will look for regular control information in subsequent slots.

Scheduling can be done bundling 4 slots, 3 slots, 2 slots, or individually, for latency tolerant data. For example, control for bundling two slots may come in the $3^{rd}$ slot, when an interval contains four slots.

Figure 12:
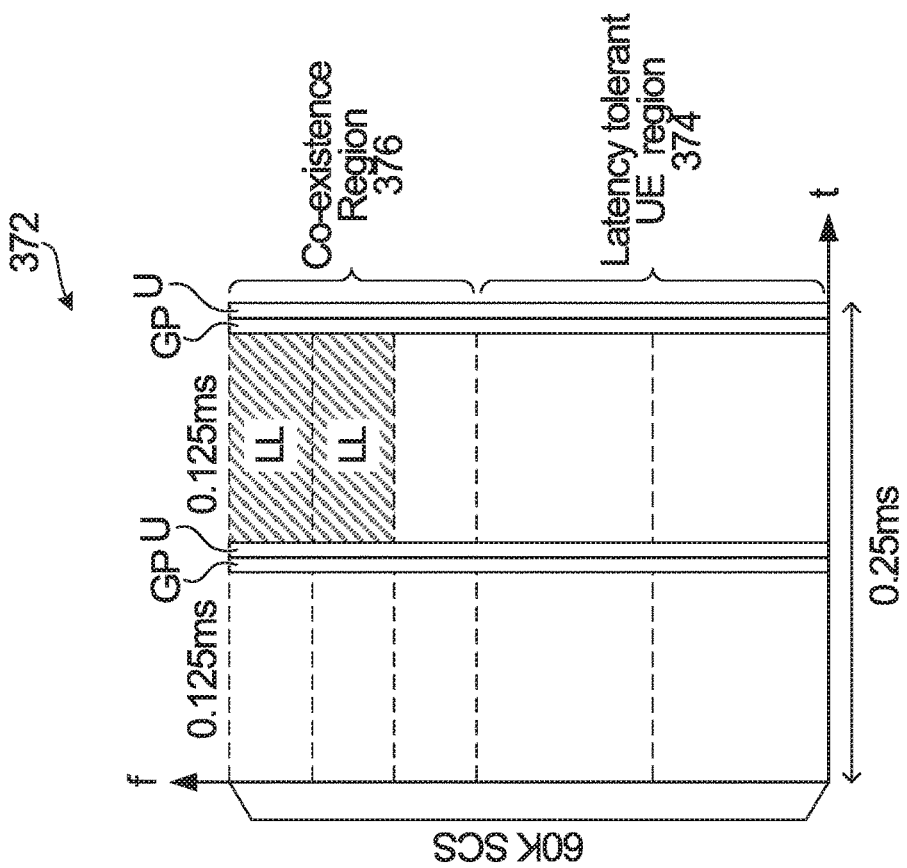
Figure 11:
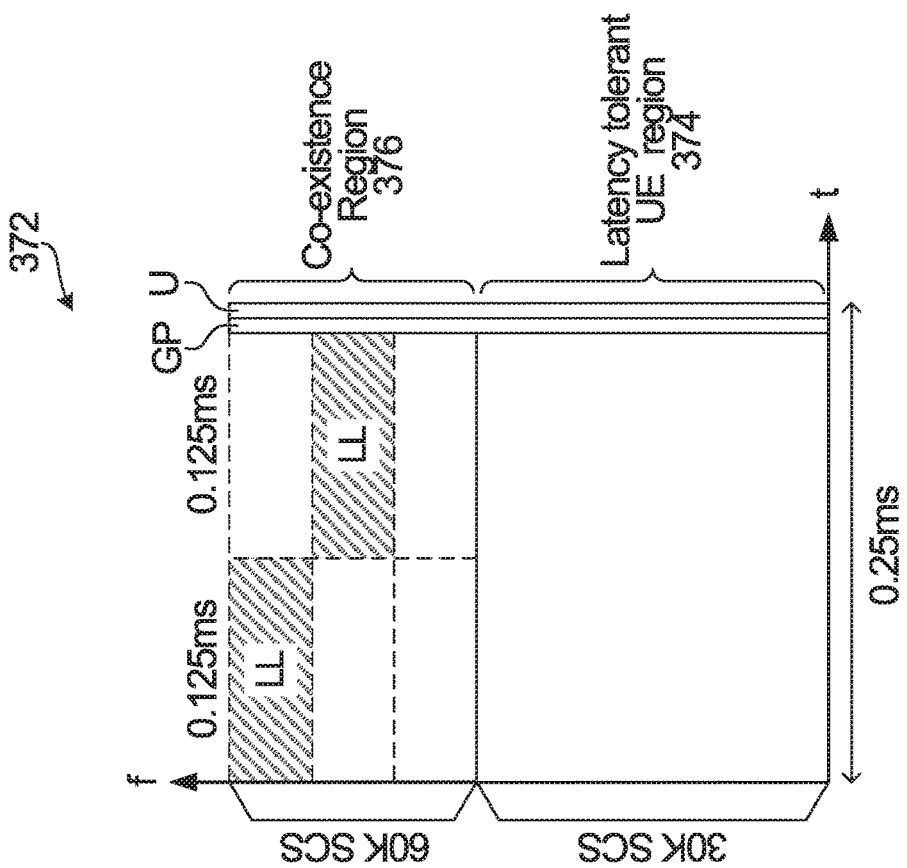

FIGS. 11 and 12 illustrate some specific examples of the embodiments described above in relation to FIG. 10. In FIGS. 11 and 12, any guard period and uplink period are respectively labelled "GP" and "U". The remaining portion of the time/frequency resources 372 are for downlink transmission. Example low latency data opportunistically scheduled is indicated using "LL". Individual OFDM symbols are not illustrated in FIGS. 11 and 12.

In FIG. 11, the co-existence region 376 has a numerology different from the latency tolerant region 374. Specifically, the subcarrier spacing in the co-existence region is 60 kHz, and the subcarrier spacing in the latency tolerant region is 30 kHz. Also, there are two downlink low latency slots in one 0.25 ms interval.

Therefore, in some embodiments, frequency division multiplexed (FDM) based numerology multiplexing may be used for latency tolerant communication and low latency communication coexistence. In some embodiments, the same slot definition, e.g. seven OFDM symbols, can be used for different numerologies, which may simplify implementation. In some embodiments, orthogonal resource allocation may be used for the low latency communications and the latency tolerant communications, for example by using different time/frequency resources. Alternatively, non-orthogonal resource allocation may be used, such as SCMA.

In FIG. 11, we show an example where we identify an eMBB only region (i.e. a latency tolerant UE region) and a coexistence region. Large eMBB packets are scheduled over a longer interval (e.g., 0.25 ms or longer) in the eMBB only region. In the coexistence region, URLLC and eMBB can be jointly scheduled, in particular small eMBB packets can be assigned in that region. Multiple URLLC slots (e.g., each slot can be of 0.125 ms) can fit within an eMBB interval. eMBB packets may adopt bundling of URLLC slots in the coexistence region with common control information at the beginning of each 0.25 ms interval, which reduces overhead.

In FIG. 12, the numerology is the same in both regions 374 and 376: 60 kHz subcarrier spacing. There are two self-contained TDD intervals in the illustrated 0.25 ms time interval. A possible benefit of FIG. 12 compared to FIG. 11 is that uplink acknowledgements and negative acknowledgements may be sent with lower latency because there is an uplink period every 0.125 ms.

Switching time between downlink and uplink can be set to 0.25 ms or 0.125 ms depending on the latency restriction on URLLC, overhead, and other considerations. Note that this approach does not require puncturing because if resources of eMBB slots are scheduled to URLLC, the eNodeB will attempt to transmit the eMBB packet from that slot at a later time, thus requiring no changes in hybrid automatic repeat request (HARQ) procedure (e.g., code block level HARQ, outer code to protect eMBB transmission from bursty interference, or weighted HARQ combining to account for degraded transmissions). If transmission of one or more bundled eMBB slots is postponed or punctured, a low overhead indicator can notify the eMBB UE of the updated scheduling. A UE specific or common search space in one or more DL symbols can be configured for latency tolerant UEs to receive puncturing indication and based on the current slot format (i.e., which symbols are DL, UL, Gap/Unknown), the UEs may skip some monitoring occasions of puncturing indication.

As discussed in embodiments above, the start time or location of a time interval (e.g. slot) for a downlink transmission to a UE may be more flexible. For example, and as described earlier in reference to FIG. 3, instead of beginning at predetermined starting points in a frame or subframe, a downlink transmission time interval may instead possibly begin every x OFDM symbols. x may be as small as one OFDM symbol. A UE is therefore configured to monitor for control information on a periodic basis, where the control information indicates a downlink transmission for the UE. The UE may be instructed to monitor for the control information once every x OFDM symbols.

Figure 13:
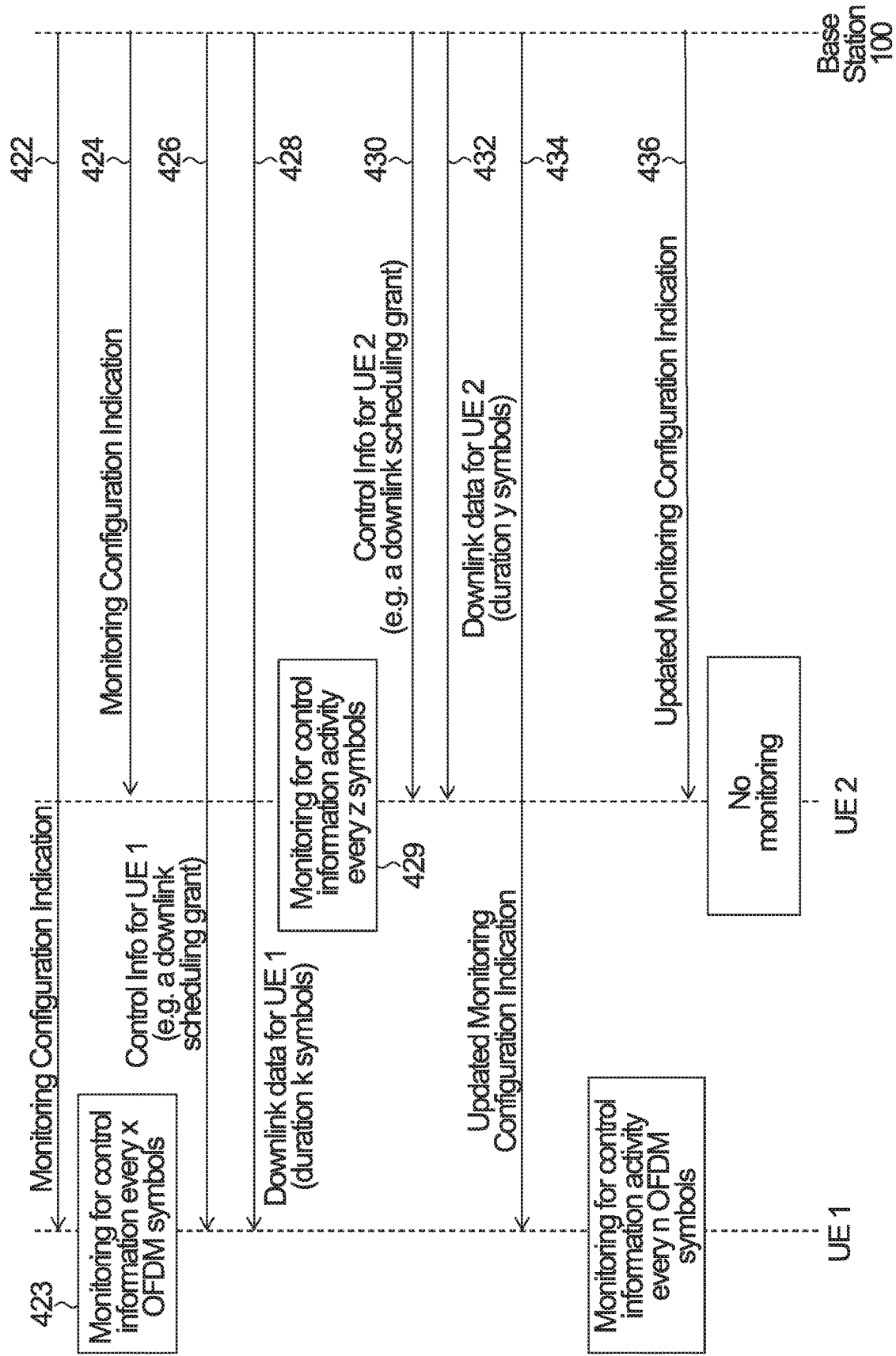
FIGS. 13 to 17 are methods according to various embodiments.

FIG. 13 is a method performed by the base station 100 and two UEs, according to one embodiment. The two UEs will be referred to as "UE 1" and "UE 2". In step 422, the base station 100 sends monitoring configuration signaling to UE 1. The monitoring configuration signaling will be referred to as a "monitoring configuration indication" in FIG. 13. The monitoring configuration indication indicates when UE 1 is to monitor for control information. For example the configuration indication may indicate the specific OFDM symbols where monitoring is to be done, a periodicity of the monitoring, and/or the start locations where a downlink transmission time interval (as indicated by the control information) may begin. In FIG. 13, the configuration indication indicates a monitoring periodicity of x OFDM symbols for UE 1. For example, if assuming the FIG. 5 embodiment, the first downlink OFDM symbol at which the UE 1 is to monitor for control information is the first downlink OFDM symbol illustrated in FIG. 5, and the periodicity is x=1, such that UE 1 is instructed to monitor for the control information at the start of each OFDM symbol, as shown at 224 in FIG. 5. The control information indicates a downlink transmission for the UE 1. The control information may be a downlink scheduling grant.

In step 423, UE 1 monitors for the control information according to the monitoring configuration indication.

In step 424, the base station 100 also sends monitoring configuration signaling (referred to as a monitoring configuration indication) to UE 2. The monitoring configuration indication indicates, for UE 2 when UE 2 is to monitor for control information. As for UE 1, the configuration indication for UE 2 may indicate the specific OFDM symbols where monitoring is to be done, a periodicity of the monitoring, and/or the start locations where a downlink transmission time interval (as indicated by the control information) may begin. In general, the OFDM symbols at which UE 2 monitors for control information may be different from the OFDM symbols at which UE 1 monitors for control information. An example of this can be seen in relation to FIG. 6: if UE 1 is UE 102a in FIG. 6 and UE 2 is UE 102b in FIG. 6, then the first OFDM symbol corresponding to UE 102a (the second OFDM symbol in the illustrated time interval) is different from the first OFDM symbol corresponding to UE 102b (the sixth OFDM symbol in the illustrated time interval).

In general, the monitoring periodicity of UE 1 and UE 2 may be different. In the example in FIG. 13, UE 1 is configured to monitor for the control information every x OFDM symbols, and UE 2 is configured to monitor for the control information every z OFDM symbols. However x may equal z.

In step 426, control information is sent to UE 1 in a downlink OFDM symbol monitored by UE 1. The control information indicates that there is a downlink transmission coming from the base station 100 to UE 1 in a particular time interval. In some embodiments, the control information may be a downlink scheduling grant.

In step 428, the downlink transmission is sent from the base station 100 to UE 1. The downlink transmission has a duration of k OFDM symbols. In some embodiments, the downlink transmission for UE 1 can begin any one symbol within the particular time interval (e.g. m>N/k possible OFDM symbol locations within the time interval). But other possibilities exist for the downlink transmission.

As an example, if UE 1 is UE 102a in FIG. 6, then the control information in step 426 is sent in the second downlink OFDM symbol in the illustrated time interval, and the control information and data transmission have a duration of three OFDM symbols. The second downlink OFDM symbol in the illustrated time interval may carry only the control information, or it may carry both the control information and some of the data transmission.

Returning to FIG. 13, in step 429 UE 2 monitors for its control information according to its monitoring configuration indication, which was sent to it in step 424. Step 429 can occur in parallel to the activities of UE 1, e.g. step 429 may occur in parallel to steps 426 and 428.

In step 430, control information is sent to UE 2 in a downlink OFDM symbol monitored by UE 2. The control information indicates that there is a downlink transmission coming from the base station 100 to UE 2 during a particular time interval. In some embodiments, the control information may be a downlink scheduling grant.

In step 432, the downlink transmission is sent from the base station 100 to UE 2. The downlink transmission has a duration of y OFDM symbols. In general, k≠y, although k may be equal to y. The downlink transmission for UE 2 can also begin at any one symbol within the particular time interval (e.g. m>N/k possible OFDM symbol locations) but it is understood that other possibilities exist for the downlink transmission such as the example shown in FIG. 6.

Optionally, in step 434, at some point in the future the monitoring configuration is updated for UE 1. As an example, the monitoring configuration may be updated so that UE 1 instead monitors for control information once every n≠x downlink OFDM symbols.

Optionally, in step 436, at some point in the future the monitoring configuration is updated for UE 2. As an example, the monitoring configuration may be updated so that UE 2 no longer monitors for control information.

Optional steps 434 and 436 are illustrated in FIG. 13.

Figure 14:
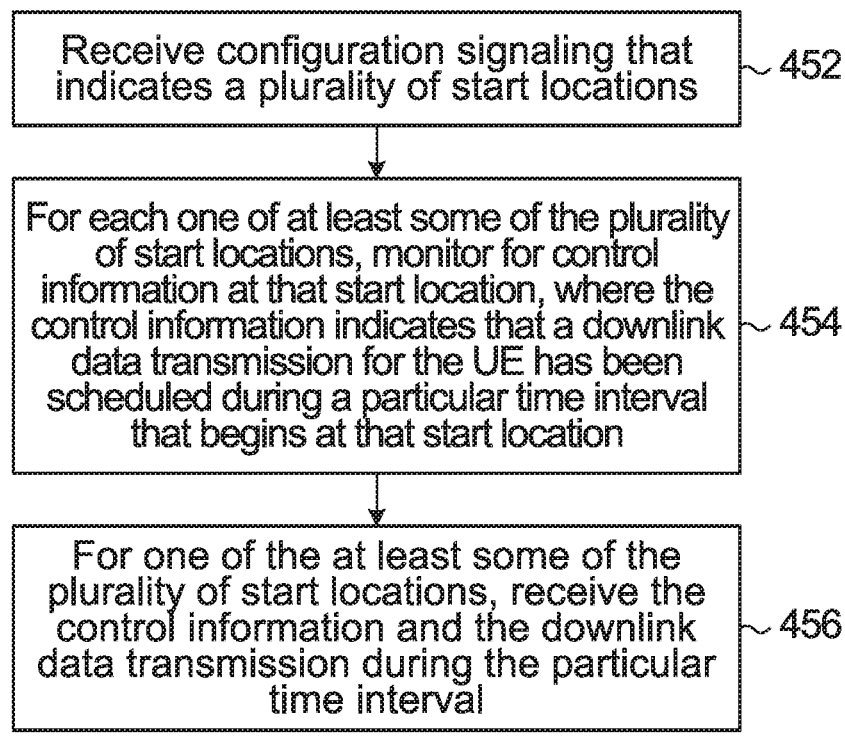

FIG. 14 is a method performed by a UE, according to one embodiment. In step 452, the UE receives configuration signaling. The configuration signaling indicates a plurality of start locations. Each start location occurs x OFDM symbols apart from an adjacent start location.

In step 454, for each one of at least some of the plurality of start locations, the UE monitors for control information at that start location. The control information indicates that a downlink data transmission for the UE has been scheduled during a particular time interval that begins at that start location.

In step 456, for one of the at least some of the plurality of start locations, the UE receives the control information and the downlink data transmission during the particular time interval.

Figure 15:
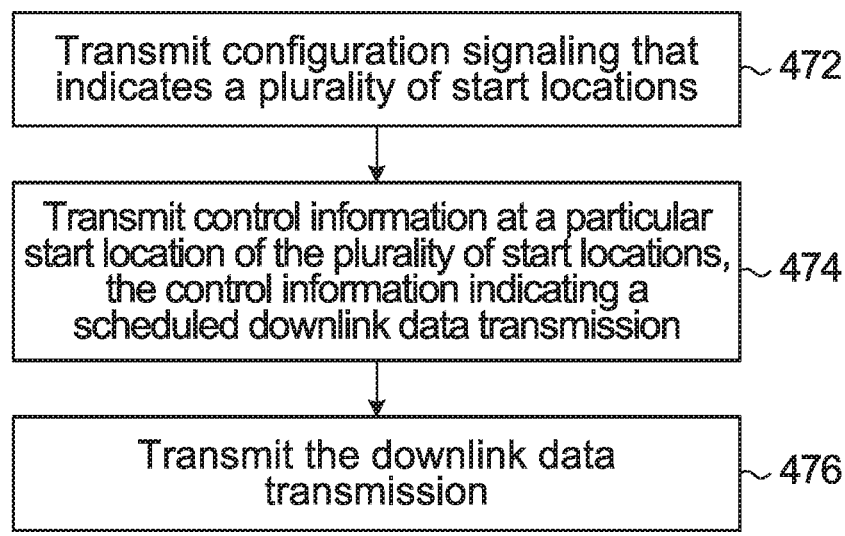

FIG. 15 is a method performed by a base station, according to another embodiment. In step 472, the base station transmits, to a UE, configuration signaling. The configuration signaling indicates a plurality of start locations, each of which the UE is to monitor for control information. Each start location occurs x OFDM symbols apart from an adjacent start location.

In step 474, the base station transmits control information at a particular start location of the plurality of start locations. The control information indicating that a downlink data transmission for the UE has been scheduled during a time interval that begins at the particular start location.

In step 476, the base station transmits the downlink data transmission during the time interval.

Figure 16:
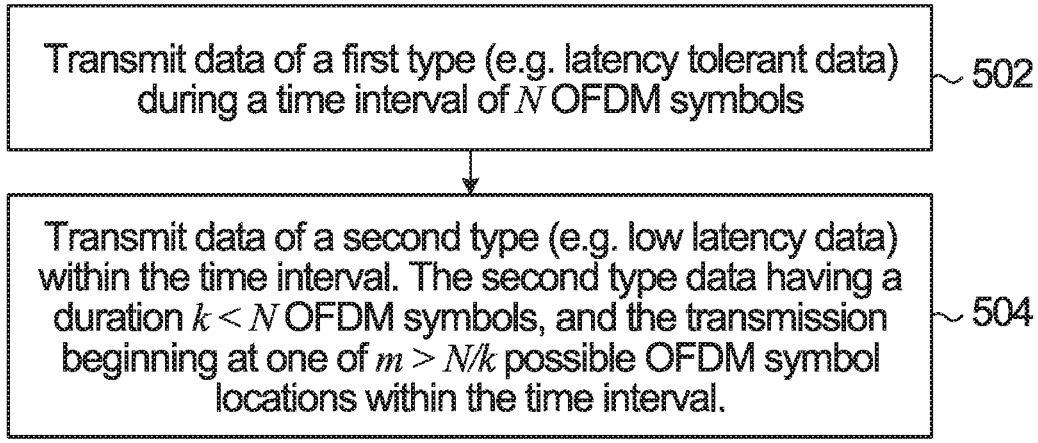

FIG. 16 is a method according to another embodiment. In step 502, data of a first type (e.g. latency tolerant data) is transmitted during a time interval. The time interval has N OFDM symbols. The time interval may be part of or all of a latency tolerant interval. In step 504, data of a second type (e.g. low latency data) is transmitted within the time interval. The data of a second type has a duration of k<N OFDM symbols. The transmission of the data of the second type can begin at one of m>N/k possible OFDM symbol locations within the time interval. The flexibility of having the data of the second type beginning at one of m>N/k possible OFDM symbol locations may allow for reduced latency transmission.

In some embodiments, the data of the first type is latency tolerant data, and the data of the second type is low latency data.

In some embodiments, transmitting the data of the second type includes transmitting a first slot of k OFDM symbols, and the method may further include: transmitting a second slot of k OFDM symbols, the second slot also beginning at one of m>N/k possible OFDM symbol locations within the time interval.

In some embodiments, the first slot and the second slot do not use overlapping time/frequency resources.

In some embodiments, the first slot and the second slot use at least some overlapping time/frequency resources.

In some embodiments, m≤N−k+1.

In some embodiments, m=N−k+1, and the transmission of data of the second type begins at one of the first N−k+1 OFDM symbol locations within the time interval.

In some embodiments, the time interval having the N OFDM symbols is the downlink portion of a TDD self-contained interval, and the data of the first type and the data of the second type is downlink data.

In some embodiments, the time interval having the N OFDM symbols is the uplink portion of a TDD self-contained interval, and the data of the first type and the data of the second type is uplink data.

In some embodiments, the time interval having the N OFDM symbols is the downlink portion of a TDD self-contained interval, the data of a second type includes downlink OFDM symbols and uplink OFDM symbols, and a guard period is interposed between the downlink OFDM symbols and the uplink OFDM symbols.

In some embodiments, the transmission of the data of the second type occurs using time/frequency resources that are scheduled for use in transmitting particular data of the first type, and the method further includes delaying transmission of the particular data of the first type.

Figure 17:
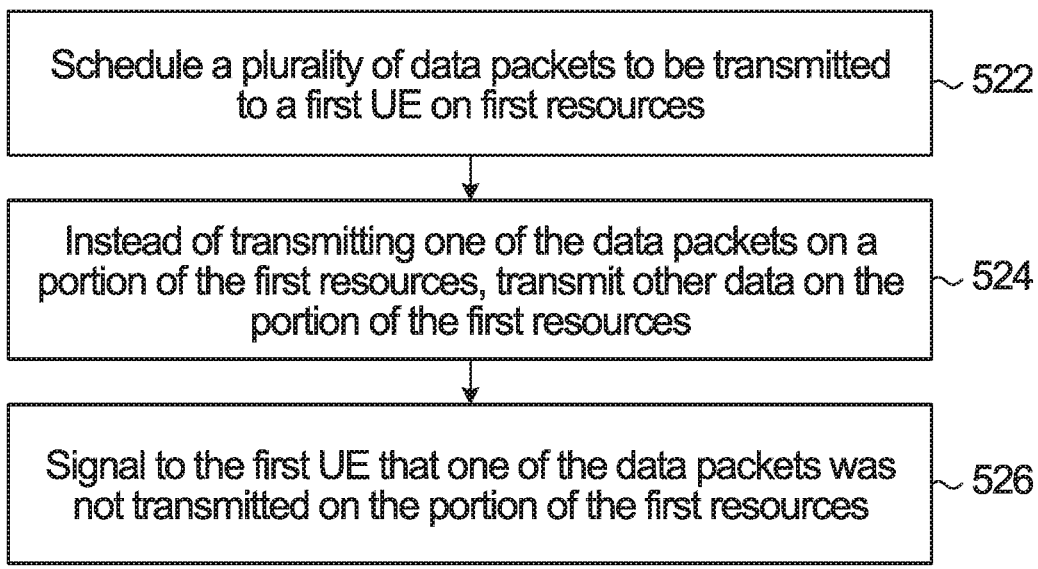

FIG. 17 is a method performed by a base station, according to another embodiment. In step 522, a plurality of data packets to be transmitted to a first UE is scheduled on first resources. The first UE may be a latency tolerant UE, and the data packets may carry latency tolerant data. In step 524, instead of transmitting one of the data packets on a portion of the first resources, other data is transmitted on the portion of the first resources. The other data may be low latency data for a low latency UE. In step 526, the base station signals to the first UE that one of the data packets was not transmitted on the portion of the first resources.

In some embodiments, data in the plurality of data packets is latency tolerant data, and the other data is low latency data.

In some embodiments, the method further includes scheduling data packets larger than each of the plurality of data packets on second resources.

In some embodiments, the subcarrier spacing of the second resources is different from the subcarrier spacing of the first resources.

In some embodiments, a base station is configured to perform any one of the method embodiments described herein.

In some embodiment, a system is configured to perform any one of the method embodiments described herein. The system may include a plurality of UEs.

Other Example Operating Environments

Figure 18:
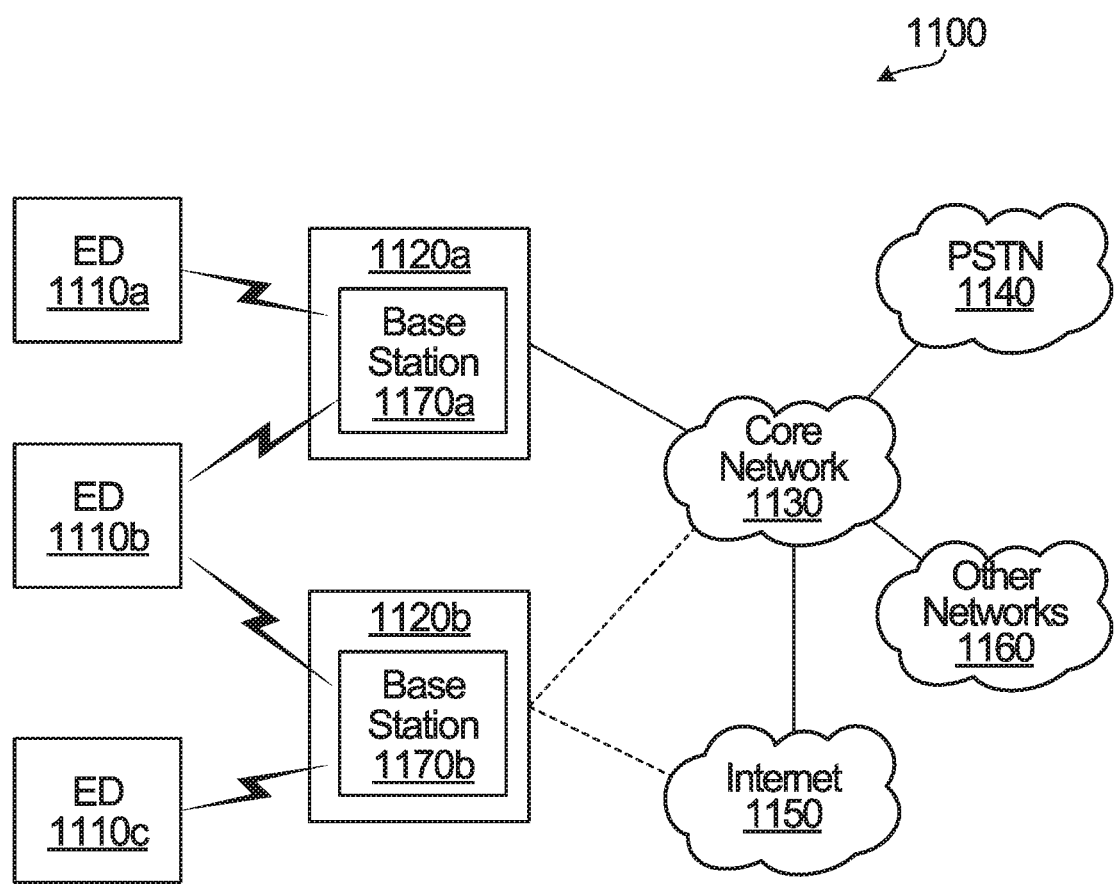
FIG. 18 illustrates an example communication system in which embodiments of the present disclosure could be implemented.

FIG. 18 illustrates an example communication system 1100 in which embodiments of the present disclosure could be implemented. In general, the system 1100 enables multiple wireless or wired elements to communicate data and other content. The purpose of the system 1100 may be to provide content (voice, data, video, text) via broadcast, narrowcast, user device to user device, etc. The system 1100 may operate efficiently by sharing resources such as bandwidth.

In this example, the communication system 1100 includes electronic devices (ED) 1110a-1110c, radio access networks (RANs) 1120a-1120b, a core network 1130, a public switched telephone network (PSTN) 1140, the Internet 1150, and other networks 1160. While certain numbers of these components or elements are shown in FIG. 18, any reasonable number of these components or elements may be included in the system 1100.

The EDs 1110a-1110c are configured to operate, communicate, or both, in the system 1100. For example, the EDs 1110a-1110c are configured to transmit, receive, or both via wireless communication channels. Each ED 1110a-1110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device. The UEs described earlier and introduced in FIGS. 1 and 2 are examples of EDs. More generally, the UEs described earlier and introduced in FIGS. 1 and 2 may be replaced with EDs.

In FIG. 18, the RANs 1120a-1120b include base stations 1170a-1170b, respectively. Each base station 1170a-1170b is configured to wirelessly interface with one or more of the EDs 1110a-1110c to enable access to any other base station 1170a-1170b, the core network 1130, the PSTN 1140, the Internet 1150, and/or the other networks 1160. For example, the base stations 1170a-1170b may include (or be) one or more of several well-known devices, such as a base transceiver station (BTS), a Node-B (NodeB), an evolved NodeB (eNodeB), a Home eNodeB, a gNodeB (sometimes called a "gigabit" NodeB), a transmission point (TP), a transmit/receive point (TRP), a site controller, an access point (AP), or a wireless router. The base station 100 introduced earlier is an example of one of base stations 1170a-1170b.

Any ED 1110a-1110c may be alternatively or jointly configured to interface, access, or communicate with any other base station 1170a-1170b, the internet 1150, the core network 1130, the PSTN 1140, the other networks 1160, or any combination of the preceding. Optionally, the system may include RANs, such as RAN 1120b, wherein the corresponding base station 1170b accesses the core network 1130 via the internet 1150, as shown.

The EDs 1110a-1110c and base stations 1170a-1170b are examples of communication equipment that can be configured to implement some or all of the functionality and/or embodiments described herein. In the embodiment shown in FIG. 18, the base station 1170a forms part of the RAN 1120a, which may include other base stations, base station controller(s) (BSC), radio network controller(s) (RNC), relay nodes, elements, and/or devices. Any base station 1170a, 1170b may be a single element, as shown, or multiple elements, distributed in the corresponding RAN, or otherwise. Also, the base station 1170b forms part of the RAN 1120b, which may include other base stations, elements, and/or devices. Each base station 1170a-1170b may be configured to operate to transmit and/or receive wireless signals within a particular geographic region or area, sometimes referred to as a coverage area. A cell may be further divided into cell sectors, and a base station 1170a-1170b may, for example, employ multiple transceivers to provide service to multiple sectors. In some embodiments a base station 1170a-1170b may be implemented as pico or femto nodes where the radio access technology supports such. In some embodiments, multiple-input multiple-output (MIMO) technology may be employed having multiple transceivers for each coverage area. The number of RAN 1120a-1120b shown is exemplary only. Any number of RAN may be contemplated when devising the system 1100.

The base stations 1170a-1170b communicate with one or more of the EDs 1110a-1110c over one or more air interfaces 1190 using wireless communication links e.g. RF, µWave, IR, etc. The air interfaces 1190 may utilize any suitable radio access technology. For example, the system 1100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 1190.

A base station 1170a-1170b may implement Universal Mobile Telecommunication System (UMTS) Terrestrial Radio Access (UTRA) to establish an air interface 1190 using wideband CDMA (WCDMA). In doing so, the base station 1170a-1170b may implement protocols such as HSPA, HSPA+ optionally including HSDPA, HSUPA or both. Alternatively, a base station 1170a-1170b may establish an air interface 1190 with Evolved UTMS Terrestrial Radio Access (E-UTRA) using LTE, LTE-A, and/or LTE-B. It is contemplated that the system 1100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 1120a-1120b are in communication with the core network 1130 to provide the EDs 1110a-1110c with various services such as voice, data, and other services. Understandably, the RANs 1120a-1120b and/or the core network 1130 may be in direct or indirect communication with one or more other RANs (not shown), which may or may not be directly served by core network 1130, and may or may not employ the same radio access technology as RAN 120a, RAN 120b or both. The core network 1130 may also serve as a gateway access between (i) the RANs 1120a-1120b or EDs 1110a-1110c or both, and (ii) other networks (such as the PSTN 1140, the Internet 1150, and the other networks 1160). In addition, some or all of the EDs 1110a-1110c may include functionality for communicating with different wireless networks over different wireless links using different wireless technologies and/or protocols. PSTN 1140 may include circuit switched telephone networks for providing plain old telephone service (POTS). Internet 1150 may include a network of computers and subnets (intranets) or both, and incorporate protocols, such as IP, TCP, UDP. EDs 1110a-1110c may be multimode devices capable of operation according to multiple radio access technologies, and incorporate multiple transceivers necessary to support such.

It is contemplated that the communication system 1100 as illustrated in FIG. 18 may support a New Radio (NR) cell, which also may be referred to as hyper cell. Each NR cell includes one or more TRPs using the same NR cell ID. The NR cell ID is a logical assignment to all physical TRPs of the NR cell and may be carried in a broadcast synchronization signal. The NR cell may be dynamically configured. The boundary of the NR cell may be flexible and the system dynamically adds or removes TRPs to from the NR cell.

In one embodiment, a NR cell may have one or more TRPs within the NR cell transmitting a UE-specific data channel, which serves a UE. The one or more TRPs associated with the UE specific data channel are also UE specific and are transparent to the UE. Multiple parallel data channels within a single NR cell may be supported, each data channel serving a different UE.

In another embodiment, a broadcast common control channel and a dedicated control channel may be supported. The broadcast common control channel may carry common system configuration information transmitted by all or partial TRPs sharing the same NR cell ID. Each UE can decode information from the broadcast common control channel in accordance with information tied to the NR cell ID. One or more TRPs within a NR cell may transmit a UE specific dedicated control channel, which serves a UE and carries UE-specific control information associated with the UE. Multiple parallel dedicated control channels within a single NR cell may be supported, each dedicated control channel serving a different UE. The demodulation of each dedicated control channel may be performed in accordance with a UE-specific reference signal (RS), the sequence and/or location of which are linked to the UE ID or other UE specific parameters.

In some embodiments, one or more of these channels, including the dedicated control channels and the data channels, may be generated in accordance with a UE specific parameter, such as a UE ID, and/or an NR cell ID. Further, the UE specific parameter and/or the NR cell ID can be used to differentiate transmissions of the data channels and control channels from different NR cells.

An ED, such as a UE, may access the communication system 1100 through at least one of the TRP within a NR cell using a UE dedicated connection ID, which allows one or more physical TRPs associated with the NR cell to be transparent to the UE. The UE dedicated connection ID is an identifier that uniquely identifies the UE in the NR cell. For example, the UE dedicated connection ID may be identified by a sequence. In some implementations, the UE dedicated connection ID is assigned to the UE after an initial access.

The UE dedicated connection ID, for example, may be linked to other sequences and randomizers which are used for PHY channel generation.

In some embodiments, the UE dedicated connection ID remains the same as long as the UE is communicating with a TRP within the NR cell. In some embodiments, the UE can keep original UE dedicated connection ID when crossing NR cell boundary. For example, the UE can only change its UE dedicated connection ID after receiving signaling from the network.

In some embodiments, any number of NR cells may be implemented in the communication system 1100. For example, FIG. 19 illustrates two neighboring NR cells in an example communication system, in accordance with an embodiment of the present disclosure.

Figure 19:
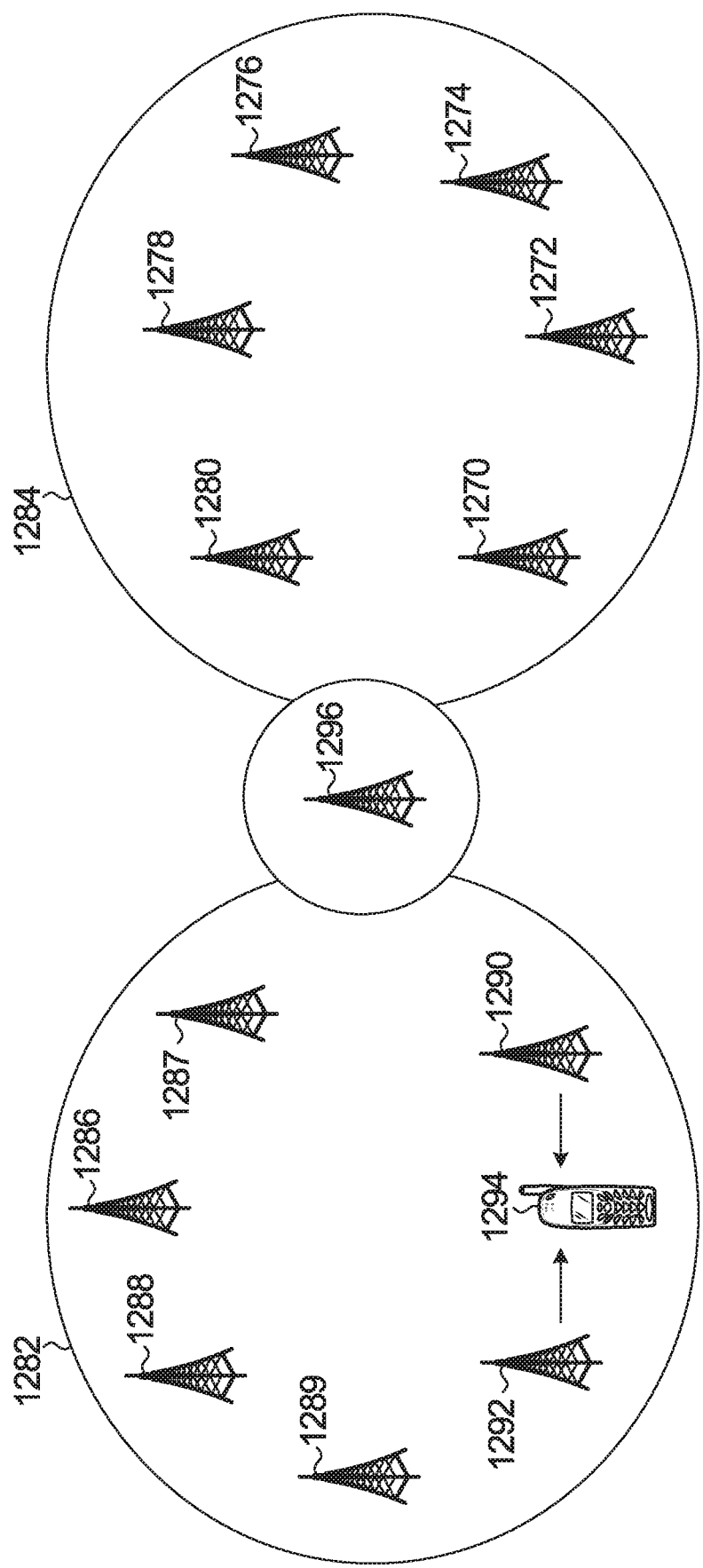
FIG. 19 illustrates two neighboring new radio (NR) cells of an example communication system in which embodiments of the present disclosure could be implemented.

As illustrated in FIG. 19, NR cells 1282, 1284 each includes multiple TRPs that are assigned the same NR cell ID. For example, NR cell 1282 includes TRPs 1286, 1287, 1288, 1289, 1290, and 1292, where TRPs 1290, 1292 communicates with an ED, such as UE 1294. It is obviously understood that other TRPs in NR cell 1282 may communicate with UE 1294. NR cell 1284 includes TRPs 1270, 1272, 1274, 1276, 1278, and 1280. TRP 1296 is assigned to NR cells 1282, 1284 at different times, frequencies or spatial directions and the system may switch the NR cell ID for transmit point 1296 between the two NR cells 1282 and 1284. It is contemplated that any number (including zero) of shared TRPs between NR cells may be implemented in the system.

In one embodiment, the system dynamically updates the NR cell topology to adapt to changes in network topology, load distribution, and/or UE distribution. In some implementations, if the concentration of UEs increases in one region, the system may dynamically expand the NR cell to include TRPs near the higher concentration of UEs. For example, the system may expand NR cell to include other TRPs if the concentration of UEs located at the edge of the NR cell increases above a certain threshold. As another example, the system may expand NR cell to include a greater concentration of UEs located between two hyper cells. In some implementations, if the traffic load increases significantly at one region, the system may also expand the NR cell associated with the region to include TRPs for the increased traffic load. For example, if the traffic load of a portion of the network exceeds a predetermined threshold, the system may change the NR cell ID of one or more TRPs that are transmitting to the impacted portion of the network.

In another embodiment, the system may change the NR cell ID associated with TRP 1296 from the NR cell ID of NR cell 1282 to the NR cell ID of NR cell 1284. In one implementation, the system can change the association of a TRP with different NR cells periodically, such as every 1 millisecond. With such a flexible NR cell formation mechanism, all UEs can be served by the best TRPs so that virtually there are no cell edge UEs.

In yet another embodiment, the shared TRP 1296 can reduce interference for UEs located at the boundary between the two NR cells 1282, 1284. UEs that are located near the boundaries of two NR cells 1282, 1284 experience fewer handovers because the shared TRP is associated with either NR cell at different times, frequencies or spatial directions. Further, as a UE moves between the NR cells 1282, 1284, the transition is a smoother experience for the user. In one embodiment, the network changes the NR cell ID of the TRP 1296 to transition a UE moving between NR cells 1282, 1284.

Figure 20:
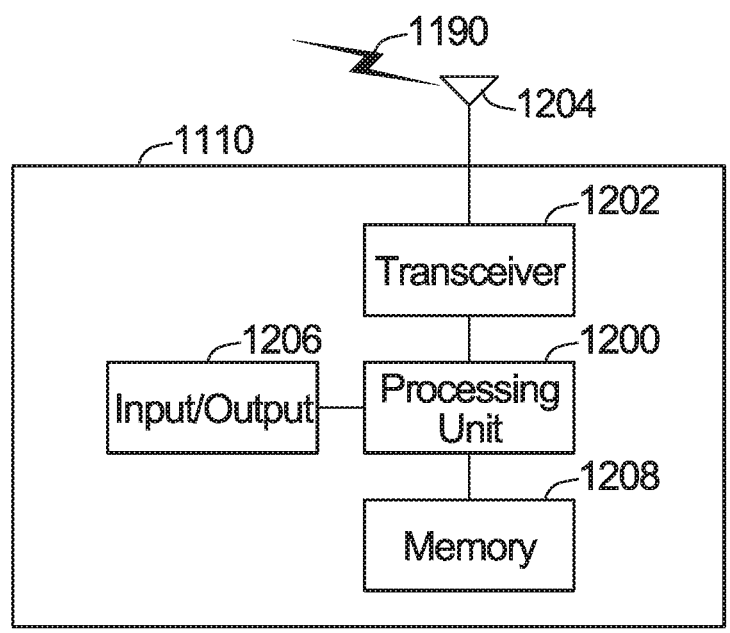
FIGS. 20 and 21 illustrate example devices that may implement the methods and teachings according to this disclosure.
Figure 21:
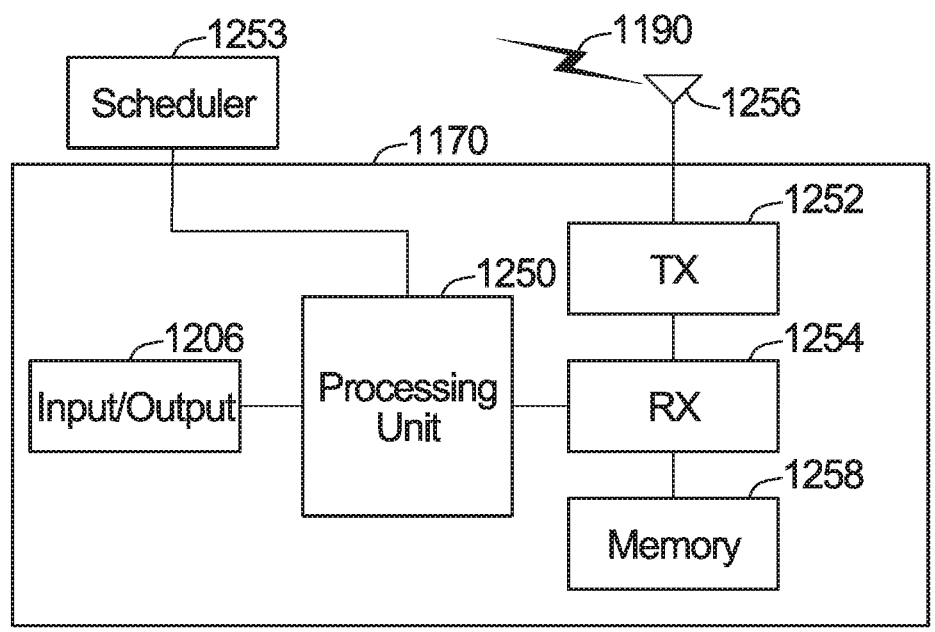

FIGS. 20 and 21 illustrate other example devices that may implement the methods and teachings according to this disclosure. In particular, FIG. 20 illustrates an example ED 1110 (e.g. one of the UEs in FIG. 1), and FIG. 21 illustrates an example base station 1170 (e.g. base station 100 in FIG. 1.). These components could be used in the system 1100 or in any other suitable system.

As shown in FIG. 20, the ED 1110 includes at least one processing unit 1200. The processing unit 1200 implements various processing operations of the ED 1110. For example, the processing unit 1200 could perform signal coding, data processing, power control, input/output processing, or any other functionality enabling the ED 1110 to operate in the system 1100. The processing unit 1200 may also be configured to implement some or all of the functionality and/or embodiments described in more detail above. Each processing unit 1200 includes any suitable processing or computing device configured to perform one or more operations. Each processing unit 1200 could, for example, include a microprocessor, microcontroller, digital signal processor, field programmable gate array, or application specific integrated circuit.

The ED 1110 also includes at least one transceiver 1202. The transceiver 1202 is configured to modulate data or other content for transmission by at least one antenna or NIC (Network Interface Controller) 1204. The transceiver 1202 is also configured to demodulate data or other content received by the at least one antenna 1204. Each transceiver 1202 includes any suitable structure for generating signals for wireless transmission and/or processing signals received wirelessly or by wire. Each antenna 1204 includes any suitable structure for transmitting and/or receiving wireless signals. One or multiple transceivers 1202 could be used in the ED 1110, and one or multiple antennas 1204 could be used in the ED 1110. Although shown as a single functional unit, a transceiver 1202 could also be implemented using at least one transmitter and at least one separate receiver.

The ED 1110 further includes one or more input/output devices 1206 or interfaces. The input/output devices 1206 facilitate interaction with a user or other devices (network communications) in the network. Each input/output device 1206 includes any suitable structure for providing information to or receiving/providing information from a user, such as a speaker, microphone, keypad, keyboard, display, or touch screen, including network interface communications.

In addition, the ED 1110 includes at least one memory 1208. The memory 1208 stores instructions and data used, generated, or collected by the ED 1110. For example, the memory 1208 could store software instructions or modules configured to implement some or all of the functionality and/or embodiments described above and that are executed by the processing unit(s) 1200. Each memory 1208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 21, the base station 1170 includes at least one processing unit 1250, at least one transmitter 1252, at least one receiver 1254, one or more antennas 1256, at least one memory 1258, and one or more input/output devices or interfaces 1266. A transceiver, not shown, may be used instead of the transmitter 1252 and receiver 1254. A scheduler 1253 may be coupled to the processing unit 1250. The scheduler 1253 may be included within or operated separately from the base station 1170. The processing unit 1250 implements various processing operations of the base station 1170, such as signal coding, data processing, power control, input/output processing, or any other functionality. The processing unit 1250 can also be configured to implement some or all of the functionality and/or embodiments described in more detail above. Each processing unit 1250 includes any suitable processing or computing device configured to perform one or more operations. Each processing unit 1250 could, for example, include a microprocessor, microcontroller, digital signal processor, field programmable gate array, or application specific integrated circuit.

Each transmitter 1252 includes any suitable structure for generating signals for wireless transmission to one or more EDs or other devices. Each receiver 1254 includes any suitable structure for processing signals received wirelessly or by wire from one or more EDs or other devices. Although shown as separate components, at least one transmitter 1252 and at least one receiver 1254 could be combined into a transceiver. Each antenna 1256 includes any suitable structure for transmitting and/or receiving wireless signals. While a common antenna 1256 is shown here as being coupled to both the transmitter 1252 and the receiver 1254, one or more antennas 1256 could be coupled to the transmitter(s) 1252, and one or more separate antennas 1256 could be coupled to the receiver(s) 1254. Each memory 1258 includes any suitable volatile and/or non-volatile storage and retrieval device(s) such as those described above in connection to the ED 1110. The memory 1258 stores instructions and data used, generated, or collected by the base station 1170. For example, the memory 1258 could store software instructions or modules configured to implement some or all of the functionality and/or embodiments described above and that are executed by the processing unit(s) 1250.

Each input/output device 1266 facilitates interaction with a user or other devices (network communications) in the network. Each input/output device 1266 includes any suitable structure for providing information to or receiving/providing information from a user, including network interface communications.

It should be appreciated that one or more steps of the embodiment methods provided herein may be performed by corresponding units or modules, e.g. the units or modules shown in FIGS. 2, 20, and/or 21. For example, a signal may be transmitted by a transmitting unit or a transmitting module. A signal may be received by a receiving unit or a receiving module. A signal may be processed by a processing unit or a processing module. Other steps may be performed by the transmitter 174, receiver 176, message processor 178, control information processor 179, transmitter 164, receiver 166, resource allocator 168, message processor 170, control information generator 169, transceiver 1202, processing unit 1200, transmitter 1252, receiver 1254, scheduler 1253, and/or processing unit 1250 described herein. The respective units/modules may be hardware, software, or a combination thereof. For instance, one or more of the units/modules may be an integrated circuit, such as FPGAs or ASICs. It will be appreciated that where the modules are software, they may be retrieved by a processor, in whole or part as needed, individually or together for processing, in single or multiple instances as required, and that the modules themselves may include instructions for further deployment and instantiation.

FURTHER EXAMPLES

In view of, and in addition to the above, the following examples are disclosed.

Example 1

A method comprising: transmitting data of a first type during a time interval, the time interval having N OFDM symbols; transmitting data of a second type within the time interval, the data of the second type having a duration comprising k<N OFDM symbols, and the transmission beginning at one of m>N/k possible OFDM symbol locations within the time interval.

Example 2

The method of example 1, wherein the data of the first type is latency tolerant data, and the data of the second type is low latency data.

Example 3

The method of example 1, wherein transmitting the data of the second type comprises transmitting a first slot of k OFDM symbols, and wherein the method further comprises transmitting a second slot of k OFDM symbols, the second slot also beginning at one of m>N/k possible OFDM symbol locations within the time interval.

Example 4

The method of example 3, wherein the first slot and the second slot do not use overlapping time/frequency resources.

Example 5

The method of example 3, wherein the first slot and the second slot use at least some overlapping time/frequency resources.

Example 6

The method of example 1, wherein $m \leq N-k+1$.

Example 7

The method of example 6, wherein $m=N-k+1$ and the transmission of data of the second type begins at one of the first $N-k+1$ OFDM symbol locations within the time interval.

Example 8

The method of example 1, wherein the time interval having the N OFDM symbols is the downlink portion of a TDD self-contained interval, and wherein the data of the first type and the data of the second type is downlink data.

Example 9

The method of example 1, wherein the time interval having the N OFDM symbols is the uplink portion of a TDD self-contained interval, and wherein the data of the first type and the data of the second type is uplink data.

Example 10

The method of example 1, wherein the time interval having the N OFDM symbols is the downlink portion of a TDD self-contained interval, wherein the data of a second type comprises downlink OFDM symbols and uplink OFDM symbols, and a guard period is interposed between the downlink OFDM symbols and the uplink OFDM symbols.

Example 11

The method of example 1, wherein the transmission of the data of the second type occurs using time/frequency resources that are scheduled for use in transmitting particular data of the first type, and wherein the method further comprises delaying transmission of the particular data of the first type.

Example 12

A base station configured to perform the method of any one of examples 1 to 11.

Example 13

A system configured to perform the method of any one of examples 1 to 11.

Example 14

The system of example 13, wherein the system comprises a plurality of UEs.

Example 15

A method performed by a base station, the method comprising: scheduling a plurality of data packets to be transmitted to a first UE on first resources; instead of transmitting one of the data packets on a portion of the first resources, transmitting other data on the portion of the first resources; signaling to the first UE that the one of the data packets was not transmitted on the portion of the first resources.

Example 16

The method of example 15, wherein data in the plurality of data packets is latency tolerant data, and wherein the other data is low latency data.

Example 17

The method of example 15, further comprising scheduling data packets larger than each of the plurality of data packets on second resources.

Example 18

The method of example 17, wherein the subcarrier spacing of the second resources is different from the subcarrier spacing of the first resources.

Example 19

A base station configured to perform the method of any one of examples 15 to 18.

Example 20

A method performed by a UE, the method comprising: receiving configuration signaling indicating a plurality of start locations, wherein each start location occurs x OFDM symbols apart from an adjacent start location; for each one of at least some of the plurality of start locations, monitoring for control information at that start location, wherein the control information indicates that a downlink data transmission for the UE has been scheduled during a particular time interval that begins at that start location; for one of the at least some of the plurality of start locations, receiving the control information and the downlink data transmission during the particular time interval.

Example 21

The method of example 20, wherein each start location is at a respective OFDM symbol.

Example 22

The method of example 20 or 21, wherein x=1.

Example 23

The method of any one of examples 20 to 22, wherein the particular time interval comprises one or more OFDM symbols, and wherein the control information is in a first OFDM symbol of the one or more OFDM symbols.

Example 24

The method of any one of examples 20 to 23, comprising monitoring for the control information only during OFDM symbols when the downlink data transmission is permitted to begin.

Example 25

The method of any one of examples 20 to 24, wherein the time interval that begins at each start location has a same time duration of k OFDM symbols.

Example 26

The method of example 25, further comprising receiving an indication of the time duration.

Example 27

The method of example 25 or 26, wherein the UE does not monitor for the control information at any OFDM symbol that is fewer than k OFDM symbols ahead of a guard period.

Example 28

The method of any one of examples 20 to 27, wherein the plurality of start locations are each different from a start location of another time interval at which another UE is to monitor for control information meant for that other UE.

Example 29

The method of any one of examples 20 to 28, wherein the downlink data transmission is a low latency data transmission.

Example 30

The method of example 23, wherein the first OFDM symbol includes both the control information and some of the downlink data transmission.

Example 31

The method of any one of examples 20 to 30, wherein the control information indicates that a downlink data transmission for the UE has been scheduled to begin at that start location.

Example 32

The method of example 23, wherein the first OFDM symbol includes the control information and none of the downlink data transmission.

Example 33

The method of any one of examples 20 to 32, wherein the particular time interval has a time duration that is different from a corresponding time duration of another time interval during which another UE may receive a downlink transmission meant for that other UE.

Example 34

The method of any one of examples 20 to 33, wherein the plurality of start locations are a first plurality of start locations, and wherein the method further comprises receiving updated configuration signaling, the updated configuration signaling indicating a second plurality of start locations, wherein each start location of the second plurality of start locations occurs n OFDM symbols apart from an adjacent start location of the second plurality of start locations, and wherein n is different than x.

Example 35

A UE comprising: a receiver to receive configuration signaling indicating a plurality of start locations, wherein each start location occurs x OFDM symbols apart from an adjacent start location; a control information processor to, for each one of at least some of the plurality of start locations, monitor for control information at that start location, wherein the control information indicates that a downlink data transmission for the UE has been scheduled during a particular time interval that begins at that start location; the receiver to, for one of the at least some of the plurality of start locations, receive the control information and the downlink data transmission during the particular time interval.

Example 36

The UE of example 35, wherein each start location is at a respective OFDM symbol.

Example 37

The UE of example 35 or 36, wherein x=1.

Example 38

The UE of any one of examples 35 to 37, wherein the particular time interval comprises one or more OFDM symbols, and wherein the control information is in a first OFDM symbol of the one or more OFDM symbols.

Example 39

The UE of any one of examples 35 to 38, wherein the control information processor is to monitor for the control information only during OFDM symbols when the downlink data transmission is permitted to begin.

Example 40

The UE of any one of examples 35 to 39, wherein the time interval that begins at each start location has a same time duration of k OFDM symbols.

Example 41

The UE of example 40, wherein the receiver is further to receive an indication of the time duration.

Example 42

The UE of example 40 or 41, wherein the control information processor is to not monitor for the control information at any OFDM symbol that is fewer than k OFDM symbols ahead of a guard period.

Example 43

The UE of any one of examples 35 to 42, wherein the plurality of start locations are each different from a start location of another time interval at which another UE is to monitor for control information meant for that other UE.

Example 44

The UE of any one of examples 35 to 43, wherein the downlink data transmission is a low latency data transmission.

Example 45

The UE of example 38, wherein the first OFDM symbol includes both the control information and some of the downlink data transmission.

Example 46

The UE of any one of examples 35 to 45, wherein the control information indicates that a downlink data transmission for the UE has been scheduled to begin at that start location.

Example 47

The UE of example 38, wherein the first OFDM symbol includes the control information and none of the downlink data transmission.

Example 48

The UE of any one of examples 35 to 47, wherein the particular time interval has a time duration that is different from a corresponding time duration of another time interval during which another UE is to receive a downlink transmission meant for that other UE.

Example 49

The UE of any one of examples 35 to 48, wherein the plurality of start locations are a first plurality of start locations, and wherein the receiver is to: receive updated configuration signaling, the updated configuration signaling indicating a second plurality of start locations, wherein each start location of the second plurality of start locations occurs n OFDM symbols apart from an adjacent start location of the second plurality of start locations, and wherein n is different than x.

Example 50

A method performed by a base station, the method comprising: transmitting, to a UE, configuration signaling that indicates a plurality of start locations, each of which the UE is to monitor for control information, wherein each start location occurs x OFDM symbols apart from an adjacent start location; transmitting control information at a particular start location of the plurality of start locations, the control information indicating that a downlink data transmission for the UE has been scheduled during a time interval that begins at the particular start location; transmitting the downlink data transmission during the time interval.

Example 51

The method of example 50, wherein each start location is at a respective OFDM symbol.

Example 52

The method of example 50 or 51, wherein x=1.

Example 53

The method of any one of examples 50 to 52, wherein the time interval comprises a plurality of adjacent OFDM symbols.

Example 54

The method of any one of examples 50 to 52, wherein the time interval comprises one or more OFDM symbols, and wherein the particular start location is at a first OFDM symbol of the one or more OFDM symbols.

Example 55

The method of example 54, wherein the control information is in the first OFDM symbol.

Example 56

The method of any one of examples 50 to 55, wherein the time interval has a time duration of k OFDM symbols.

Example 57

The method of any one of examples 50 to 56, wherein the downlink data transmission is a low latency data transmission.

Example 58

The method of any one of examples 50 to 57, wherein the UE is a first UE, wherein the configuration signaling is first configuration signaling, wherein the plurality of start locations is a first plurality of start locations, and wherein the method further comprises: transmitting, to a second UE, second configuration signaling that indicates a second plurality of start locations, each of which the second UE is to monitor for control information, wherein each start location of the second plurality of start locations occurs z OFDM symbols apart from an adjacent start location of the second plurality of start locations.

Example 59

The method of example 58, wherein x=z.

Example 60

The method of example 55, wherein the first OFDM symbol includes both the control information and some of the downlink data transmission.

Example 61

The method of example 55, wherein the first OFDM symbol includes the control information and none of the downlink data transmission.

Example 62

The method of any one of examples 50 to 61, wherein the time interval has a time duration that is different from a time duration of another time interval during which another downlink transmission is sent to another UE.

Example 63

The method of any one of examples 50 to 62, wherein the plurality of start locations are a first plurality of start locations, and wherein the method further comprises transmitting updated configuration signaling, the updated configuration signaling indicating a second plurality of start locations, wherein each start location of the second plurality of start locations occurs n OFDM symbols apart from an adjacent start location of the second plurality of start locations, and wherein n is different from x.

Example 64

The method of any one of examples 50 to 63, further comprising transmitting, to the UE, an instruction to stop monitoring for the control information.

Example 65

A base station comprising: a control information generator to generate configuration signaling that indicates a plurality of start locations, each of which the UE is to monitor for control information, wherein each start location occurs x OFDM symbols apart from an adjacent start location; a transmitter to transmit to the UE: the configuration signaling; the control information at a particular start location of the plurality of start locations, the control information indicating that a downlink data transmission for the UE has been scheduled during a time interval that begins at the particular start location; the downlink data transmission during the time interval.

Example 66

The base station of example 65, wherein each start location is at a respective OFDM symbol.

Example 67

The base station of example 65 or 66, wherein x=1.

Example 68

The base station of any one of examples 65 to 67, wherein the time interval comprises a plurality of adjacent OFDM symbols.

Example 69

The base station of any one of examples 65 to 68, wherein the time interval comprises one or more OFDM symbols, and wherein the particular start location is at a first OFDM symbol of the one or more OFDM symbols.

Example 70

The base station of example 69, wherein the control information is in the first OFDM symbol.

Example 71

The base station of any one of examples 65 to 70, wherein the time interval has a time duration of k OFDM symbols.

Example 72

The base station of any one of examples 65 to 71, wherein the downlink data transmission is a low latency data transmission.

Example 73

The base station of any one of examples 65 to 72, wherein the UE is a first UE, wherein the configuration signaling is a first configuration signaling, wherein the plurality of start locations is a first plurality of start locations, and wherein the transmitter is further to: transmit, to a second UE, second configuration signaling that indicates a second plurality of start locations, each of which the second UE is to monitor for control information, wherein each start location of the second plurality of start locations occurs z OFDM symbols apart from an adjacent start location of the second plurality of start locations.

Example 74

The base station of example 73, wherein x=z.

Example 75

The base station of example 70, wherein the first OFDM symbol includes both the control information and some of the downlink data transmission.

Example 76

The base station of example 70 wherein the first OFDM symbol includes the control information and none of the downlink data transmission.

Example 77

The base station of any one of examples 65 to 76, wherein the time interval has a time duration that is different from a time duration of another time interval during which another downlink transmission is to be sent to another UE.

Example 78

The base station of any one of examples 65 to 77, wherein the plurality of start locations are a first plurality of start locations, and wherein the transmitter is further to: transmit updated configuration signaling, the updated configuration signaling indicating a second plurality of start locations, wherein each start location of the second plurality of start locations occurs n OFDM symbols apart from an adjacent start location of the second plurality of start locations, and wherein n is different from x.

Example 79

The base station of any one of examples 65 to 78, wherein the transmitter is further to: transmit, to the UE, an instruction to stop monitoring for the control information.

Example 80

A base station comprising a memory and at least one processor, wherein instructions are stored in the memory that, when executed by the at least one processor, cause the base station to perform any one of the base station method examples outlined above.

Example 81

A UE comprising a memory and at least one processor, wherein instructions are stored in the memory that, when executed by the at least one processor, cause the UE to perform any one of the UE method examples outlined above.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method performed by a user equipment (UE), the method comprising:
   receiving configuration signaling indicating first and second start locations, wherein the second start location occurs x orthogonal frequency-division multiplexing (OFDM) symbols apart from the first start location;
   for each one of the start locations, monitoring for control information at that start location, wherein the control information indicates that a downlink data transmission for the UE has been scheduled during a particular time interval; and
   for one of the start locations, receiving the downlink data transmission during the particular time interval.

2. The method of claim 1, wherein each start location is at a respective OFDM symbol.

3. The method of claim 1, wherein x=1.

4. The method of claim 1, wherein the particular time interval comprises one or more OFDM symbols, and wherein the control information is in a first OFDM symbol of the one or more OFDM symbols.

5. The method of claim 1, further comprising monitoring for the control information only during OFDM symbols when the downlink data transmission is permitted to begin.

6. The method of claim 1, wherein the start locations are different from a start location at which another UE is to monitor for control information meant for that other UE.

7. The method of claim 4, wherein the first OFDM symbol includes both the control information and some of the downlink data transmission.

8. The method of claim 1, wherein the control information indicates that the downlink data transmission for the UE has been scheduled to begin at that start location.

9. The method of claim 1, wherein the particular time interval begins at that start location.

10. The method of claim 1, wherein the first and second start locations are adjacent start locations.

11. The method of claim 1, wherein the control information is also received during the particular time interval.

12. The method of claim 11, wherein the control information is in a first OFDM symbol of the particular time interval.

13. A user equipment (UE) comprising:
   a receiver configured to receive configuration signaling indicating first and second start locations, wherein the second start location occurs x orthogonal frequency-division multiplexing (OFDM) symbols apart from the first start location; and
   a control information processor configured to, for each one of the start locations, monitor for control information at that start location, wherein the control information indicates that a downlink data transmission for the UE has been scheduled during a particular time interval,
   wherein the receiver is further configured to receive, for one of the start locations, the downlink data transmission during the particular time interval.

14. The UE of claim 13, wherein each start location is at a respective OFDM symbol.

15. The UE of claim 13, wherein x=1.

16. The UE of claim 13, wherein the particular time interval comprises one or more OFDM symbols, and wherein the control information is in a first OFDM symbol of the one or more OFDM symbols.

17. The UE of claim 13, wherein the control information processor is further configured to monitor for the control information only during OFDM symbols when the downlink data transmission is permitted to begin.

18. The UE of claim 13, wherein the start locations are different from a start location at which another UE is to monitor for control information meant for that other UE.

19. The UE of claim 16, wherein the first OFDM symbol includes both the control information and some of the downlink data transmission.

20. The UE of claim 13, wherein the control information indicates that the downlink data transmission for the UE has been scheduled to begin at that start location.

21. The UE of claim 13, wherein x=14.

22. The method of claim 1, wherein x=14.

23. A method performed by a user equipment (UE), the method comprising:
   receiving configuration signaling indicating a first start location and a second start location, the second start location being located one or more orthogonal frequency-division multiplexing (OFDM) symbols from the first start location;
   monitoring the first start location and the second start location to detect control information at either the first start location and the second start location, the control information indicating that a downlink data transmission for the UE has been scheduled during a particular time interval; and
   receiving the downlink data transmission during the particular time interval in accordance with the control information.

24. The method of claim 23, wherein the first start location is located one OFDM symbol from the second start location.

25. The method of claim 23, wherein the first start location is located fourteen OFDM symbols from the second start location.

26. The method of claim 23, wherein the particular time interval comprises a set of one or more OFDM symbols, and wherein the control information is in a first OFDM symbol in the set of one or more OFDM symbols.

27. The method of claim 23, wherein the control information indicates that the downlink data transmission for the UE has been scheduled to begin at a corresponding one of the first start location or the second start location in which the control information was detected.

28. The method of claim 23, wherein the particular time interval begins at a corresponding one of the first start location or the second start location in which the control information was detected.

29. The method of claim 23, wherein the control information is received during the particular time interval in which the downlink data transmission is received.

30. The method of claim 23, wherein the control information is received in a first OFDM symbol of the particular time interval.

* * * * *